(12) United States Patent
Miranbeigi et al.

(10) Patent No.: US 12,500,425 B2
(45) Date of Patent: Dec. 16, 2025

(54) UNIFIED CONTROL STRATEGIES FOR GRID-CONNECTED CONVERTERS

(71) Applicant: Georgia Tech Research Corporation, Atlanta, GA (US)

(72) Inventors: Mohammadreza Miranbeigi, Atlanta, GA (US); Rajendra Prasad Kandula, Atlanta, GA (US); Deepak M. Divan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 244 days.

(21) Appl. No.: 18/276,409

(22) PCT Filed: Feb. 9, 2022

(86) PCT No.: PCT/US2022/015761
§ 371 (c)(1),
(2) Date: Aug. 8, 2023

(87) PCT Pub. No.: WO2022/173791
PCT Pub. Date: Aug. 18, 2022

(65) Prior Publication Data
US 2024/0113526 A1    Apr. 4, 2024

Related U.S. Application Data

(60) Provisional application No. 63/147,630, filed on Feb. 9, 2021.

(51) Int. Cl.
H02J 3/38 (2006.01)
(52) U.S. Cl.
CPC .............. H02J 3/388 (2020.01); H02J 3/381 (2013.01); H02J 2203/10 (2020.01); H02J 2300/40 (2020.01)

(58) Field of Classification Search
CPC ........ H02J 3/381; H02J 3/388; H02J 2300/40; H02J 2203/10
See application file for complete search history.

(56) References Cited

U.S. PATENT DOCUMENTS 11,133,675 B2 *  9/2021  Moore ...................... H02J 3/14
2012/0158202 A1  6/2012  Yano et al.
(Continued)

OTHER PUBLICATIONS

International Search Report and Written Opinion from Application No. PCT/US2022/015761 dated Jul. 6, 2022.
(Continued)

Primary Examiner — Harry R Behm
(74) Attorney, Agent, or Firm — TROUTMAN PEPPER LOCKE LLP; Ryan A. Schneider; Stephanie J. Remy

(57) ABSTRACT

A universal control (UniCon) scheme for grid-connected converters is presented herein that allows operation automatically in grid-following, grid-firming, and grid-forming modes. The converter does not need information on the grid or connected sources and loads. The converter can set its own operating point based on local measurements. The converter can operate over a wide range of typically encountered steady-state, transient, and fault conditions. UniCon realizes a universal control strategy for converters on the grid, allowing operation in distinct modes, including dispatch in grid connected mode, and automatic load sharing in islanded or microgrid mode. Under transient conditions, the converters provide inertial support and improve damping to stabilize and reduce disturbances. Multiple converters on the system do not require detailed system knowledge or low-latency communications for fast coordination, using communications when available for slow coordination and system level optimization.

23 Claims, 27 Drawing Sheets

(56) References Cited

U.S. PATENT DOCUMENTS

| | | | | |
|---|---|---|---|---|
| 2014/0307494 A1* | 10/2014 | Wu | ............................ | H02J 3/50 |
| | | | | 363/97 |
| 2014/0316604 A1* | 10/2014 | Ortjohann | ................ | H02J 3/381 |
| | | | | 700/298 |
| 2016/0306372 A1 | 10/2016 | Holveck et al. | | |
| 2019/0123662 A1 | 4/2019 | Zhang | | |
| 2019/0181645 A1 | 6/2019 | Majumder | | |
| 2019/0341781 A1 | 11/2019 | Marchegiani et al. | | |
| 2021/0249862 A1* | 8/2021 | Awal | ......................... | H02J 3/38 |
| 2021/0328437 A1* | 10/2021 | Mowry | ..................... | H02J 1/12 |
| 2021/0328438 A1* | 10/2021 | Mowry | ..................... | H02J 3/40 |

OTHER PUBLICATIONS

Extended European Search Report from European Application No. 22753237.1 dated Dec. 11, 2024.

Rosso, et al., "Grid forming converters: an overview of control approaches and future trends," 2020 IEEE Energy Conversion Congress and Exposition (EGGE), Detroit, MI, 2020, pp. 4292-4299.

Rye, et al., "AC Impedance Characterization of a PV Inverter with Grid-Forming Control," 2020 IEEE Energy Conversion Congress and Exposition (EGGE), Detroit, MI, USA, 2020, pp. 6179-6184.

Wang, et al., "Grid-Synchronization Stability of Converter-Based Resources-An Overview," in IEEE Open Journal of Industry Applications, vol. 1, pp. 115-134, 2020.

\* cited by examiner

Fault Incidence

During fault operation

Fault recovery

UNIFIED CONTROL STRATEGIES FOR GRID-CONNECTED CONVERTERS

CROSS-REFERENCE TO RELATED APPLICATIONS

This application claims the benefit of U.S. Provisional Application Ser. No. 63/147,630 filed Feb. 9, 2021, which is incorporated herein by reference in its entirety as if fully set forth below.

FIELD

The present invention generally relates to power electronics and control thereof. More specifically, the present invention relates to devices and methods for unified control of grid-connected converters.

BACKGROUND

The grid is rapidly transitioning from a system powered completely by synchronous generators to a system with an increasing penetration of converters fed from distributed energy resources. At low penetration levels of converters it is reasonable to assume a stiff grid and to control the converters with a grid-following strategy. As converter penetration increases, the need to operate the same converters in grid-connected mode sometimes, and in grid-islanded mode at other times, poses a control challenge as the converters have to change operating modes. Further, because converters behave very differently from generators, especially under transient and fault conditions, significant change in control strategy is often required in the two distinct modes. Yet, it may not be easy to distinguish between the two modes. Communications for real-time control and coordination, could in principle help mitigate the problem, but requires low-latency communications and accurate system knowledge—very challenging in a geographically-dispersed constantly-changing system.

Examples of major issues that may occur at high inverter-based resource (IBR) penetration include loss of inertia, converter interactions, reduced system stability, and increased possibility of cascading failure. Converter control has often had to contend with resonances, transient overloads leading to current limited operation and loss of control with the rest of the system. Major faults and network changes can result in system transients that can result in tripping of circuits or oscillatory behavior, and can be challenging for protection systems. Finally, it may not be possible to know how large the converter being controlled is relative to the system to which it is connected. These unknowns present a challenge for the design of converter controllers using standard techniques, which are often based on a knowledge of the system, and are focused on optimizing converter behavior, rather than system behavior.

SUMMARY

A universal control (UniCon) scheme for grid-connected converters is presented herein. One aim of the UniCon scheme is to control converters such that the converters are able to transition from today's synchronous generator dominated grid to an inverter-based resources (IBR) dominated grid.

In some embodiments, the UniCon scheme allows operation of converters automatically in grid-following, grid-firming, and grid-forming modes. In some embodiments, the converter does not need information on the grid or connected sources and loads and is able to set its own operating point based on local measurements. In some embodiments, the converter can operate over a wide range of typically encountered steady-state, transient and fault conditions. In some embodiments, the converter control strategy can operate with a mix of synchronous generators as well as grid-following and grid-forming converters connected to the grid, and can operate with stiff or weak grids, or microgrids. In some embodiments, converter control is based on the assumption that there may be many (even hundreds) converters connected to the grid, and that all converters will try to collaborate to meet system objectives. In some embodiments, UniCon realizes a universal control strategy for converters on the grid, allowing operation in distinct modes, including dispatch in grid connected mode, and automatic load sharing in islanded or microgrid mode. In some embodiments, under transient conditions, the converters provide inertial support and improve damping to stabilize and reduce disturbances. In some embodiments, multiple converters on the system do not require detailed system knowledge or low-latency communications for fast coordination, using communications when available for slow coordination and system level optimization. The proposed control strategy has several distinct elements that have to all function in an integrated manner to realize desired overall system level behavior.

In one embodiment, a converter controller is configured to control a converter in grid forming mode without relying on a measurement of a frequency of a converter terminal voltage.

The converter controller can be configured to synchronize the converter with a different grid forming converter, a microgrid, and/or a grid.

The converter controller can be configured to control the converter in an islanded mode after getting disconnected from a network comprising another grid forming converter, or a microgrid, or a grid.

The converter controller can be configured to synchronize the converter with a different grid forming converter, a microgrid, and/or a grid having a different frequency and phase without exceeding a rating of the grid forming converter.

The converter controller can be configured to control the converter under high rate of change of frequency conditions.

The converter controller can be configured to control the converter under generation/load changes.

The converter controller can be configured to dynamically manage real power and reactive power during a transient.

The converter controller can be configured to synchronize a reference voltage phase of a reference voltage waveform of the converter to a terminal voltage phase of a terminal voltage waveform of the converter in response to a phase jump of the terminal voltage phase.

The converter controller can be configured to black-start a microgrid comprising the converter.

The converter controller can be configured to manage active and reactive power sharing under widely varying short circuit ratios and/or X/R (reactance/resistance) ratios.

The converter controller can be configured to control a first grid forming converter to synchronize the first grid forming converter with a second grid forming converter.

In another embodiment, the converter controller can include a phase jump module, an adaptive inertia module, and a virtual impedance module.

The converter controller can be configured to control a grid forming converter to synchronize the grid forming converter with a microgrid and/or grid.

The phase jump module can be configured to set a reference voltage phase of the converter in response to a terminal voltage waveform of the converter abruptly moving out of sync with a reference voltage waveform of the converter.

The phase jump module can be configured to set the reference voltage phase to the phase of the terminal voltage waveform through a zero inertia response.

The phase jump module can be configured to synchronize the reference voltage waveform to the terminal voltage waveform without modifying a voltage magnitude of the reference voltage waveform.

The phase jump module can be configured to nonlinearly adjust the reference voltage phase.

The phase jump module can be configured to jump the reference voltage phase to an opposite quadrant, to avoid the reference voltage waveform and the terminal voltage waveform moving in synch but in opposite directions.

The phase jump module can be engaged in response to one of: 1) a difference in voltage between the terminal voltage waveform and the reference voltage waveform being above a voltage threshold, or 2) current through filter inductor of the converter being above a current threshold.

The phase jump module can be configured to: a) determine a phase angle jump based at least in part on a difference in voltage between the reference voltage waveform and the terminal voltage waveform (E–$V_t$), current through filter inductor of the converter, and terminal voltage waveform; and b) set the reference voltage phase such that the phase angle jump and angular frequency of the reference voltage waveform times sampling time are added to the reference voltage phase.

The phase angle jump can be proportionate to a function (f) of the difference in voltage (f(E–$V_t$)). The function (f) can be proportionate to a constant, a linear function, or a non-linear function. The function (f) can include hyperbolic tangent (tanh (E–$V_t$)).

A frequency loop including the adaptive inertia module can be configured to provide an output phase angle (θ(t)). The phase angle jump can be equal to $\theta_{jump}$, where $$\theta_{jump} = -\theta(t) + \sin^{-1}\left[sat\left(\frac{-ki(t) + V_t}{E}\right)\right].$$

The phase jump module can be configured to repeat steps a) through b) until the phase jump module is disengaged.

The phase jump module can be disengaged in response to one of: 1) the difference in voltage being below a voltage threshold and a current through filter inductor being below a current threshold, or 2) a predetermined number of adjustments to the reference voltage phase are made, or 3) a predetermined time is elapsed since engagement of the phase jump module, or 4) steps a) through b) being performed a predetermined number of times.

The converter controller can further include a droop control module configured to set a reference power of the converter.

The droop control module can be configured to set the reference power of the converter based at least in part on an inverse relationship between active power and frequency of the converter.

The droop control module can be in a feedback loop with the adaptive inertia module.

A difference of an output of the droop control module and terminal power can be provided as an input to the adaptive inertia module.

A sum of an output of the adaptive inertia module and a reference angular frequency of the reference voltage waveform can be provided as an input to the droop control module.

The adaptive inertia module can be configured to set an inertia constant of the converter based at least in part on a power difference between terminal power of the converter and a reference power of the converter.

The adaptive inertia module can be configured to synchronize an internal frequency and phase of the reference voltage waveform to a terminal frequency and phase of the terminal voltage waveform without requiring a measurement of frequency of the terminal voltage waveform.

The adaptive inertia module can be configured to set the inertia constant based solely on: 1) a measured power of the converter; and/or 2) a difference between the reference power and the measured power; and/or 3) a terminal voltage magnitude of the terminal voltage waveform. The adaptive inertia module can be configured to set the inertia constant based solely on just one of any of the three previously listed metrics, a combination of any of two of the three previously listed metrics, or all three of the three previously listed metrics.

The inertia constant can be based at least in part on a nonlinear function of the power difference.

The inertia constant can be a based at least in part on a polynomial function of the power difference.

A damping coefficient of the converter can be based at least in part on the power difference.

The damping coefficient can be based at least in part on a nonlinear function of the power difference.

The damping coefficient of the converter can be proportional to an inverse square-root of the inertia constant.

The virtual impedance module can dynamically vary an effective output impedance of the converter.

The virtual impedance module can include a virtual impedance configured to increase impedance in response to increased current.

The virtual impedance can include a virtual resistor configured to increase resistance using a nonlinear function in response to increased current.

The virtual impedance module can further include a constant virtual inductor.

The virtual impedance can include a virtual resistor and a virtual inductor. Inductance of the virtual inductor and resistance of the virtual resistor can each be configured to increase in respond to increased current using an integrator.

A frequency loop including the adaptive inertia module can be configured to provide an output frequency. The output frequency can be kept constant in a freeze mode when the terminal voltage is below a predetermined value for a predetermined amount of time. The output frequency can come out of freeze mode when the terminal voltage is above a predetermined value for a predetermined amount of time.

In another embodiment a converter controller can be configured to control a grid forming converter without relying on a measurement of a frequency of a terminal voltage waveform of the grid forming converter.

The converter controller can be configured to synchronize the grid forming converter with a different grid forming converter, a microgrid, and/or a grid.

The converter controller can be configured control the grid forming converter in an island mode disconnected from the different grid forming converter, the microgrid, and the grid.

The converter controller can be configured to synchronize the grid forming converter with a different grid forming converter, a microgrid, and/or a grid having a different frequency and phase without exceeding ratings of the grid forming converter.

The converter controller can be configured to control the grid forming converter under high rate of change of frequency conditions.

The converter controller can be configured to control the grid forming converter under generation/load changes.

The converter controller can be configured to dynamically manage real power and reactive power during a transient.

The converter controller can be configured to synchronize a reference voltage phase of a reference voltage waveform of the grid forming converter to a terminal voltage phase of a terminal voltage waveform of the grid forming converter in response to a phase jump of the terminal voltage phase.

The converter controller can be configured to black-start a microgrid comprising the grid forming converter.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 8B is a plot of load voltage of a second converter; FIG. 8C is a plot of current of a first converter; FIG. 8D is a plot of current of a second converter; FIG. 8E is a plot of internal voltage of converters; FIG. 8F is a plot of output power of converters; and FIG. 8G is a plot of converters frequency according to aspects of the present invention.

FIG. 11B is a plot of variable D and J according to aspects of the present invention.

FIG. 14B illustrates grid frequency response with and without supporting inertia from UniCon according to aspects of the present invention.

DETAILED DESCRIPTION

Figure 1:
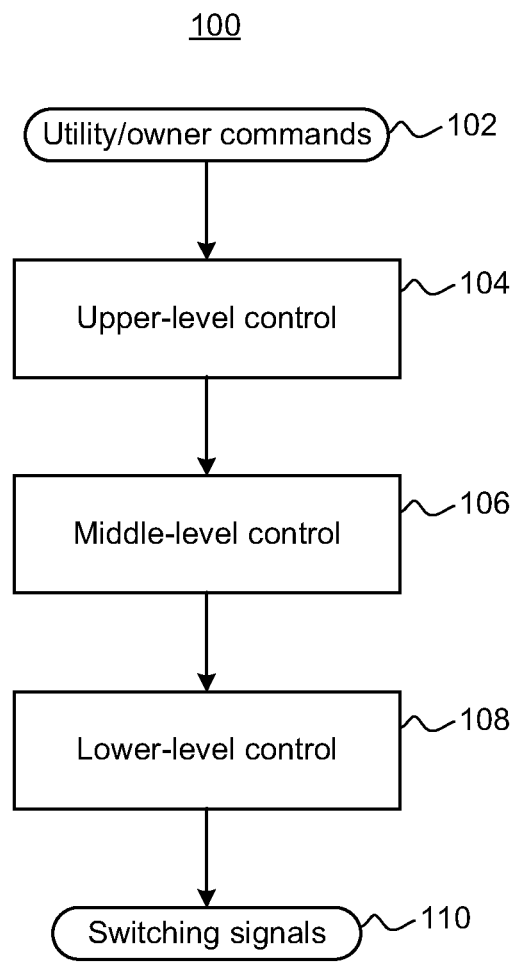
FIG. 1 is a flow diagram illustrating structure of converter control according to aspects of the present invention.

As used herein, the term "power electronic converter" is intended to include different types of power electronic converters used for performing different functions (such as inversion, rectification, etc.) which are rated from a few milliwatts to a few thousand kilowatts. The term "power electronic converter" is otherwise understood to have a plain and ordinary meaning as understood by a person skilled in the pertinent art.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±20% of the recited value, e.g. "about 90%" may refer to the range of values from 71% to 99%.

As used herein, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Computer readable medium can be non-transitory. Non-transitory computer-readable media include, but are not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable instructions and/or data.

As used herein, the term "computing system" is intended to include stand-alone machines or devices and/or a combination of machines, components, modules, systems, servers, processors, memory, detectors, user interfaces, computing device interfaces, network interfaces, hardware elements, software elements, firmware elements, and other computer-related units. By way of example, but not limitation, a computing system can include one or more of a general-purpose computer, a special-purpose computer, a processor, a portable electronic device, a portable electronic medical instrument, a stationary or semi-stationary electronic medical instrument, or other electronic data processing apparatus.

As used herein, the term "non-transitory computer-readable media" includes, but is not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store computer readable information.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The components, steps, and materials described hereinafter as making up various elements of the disclosed technology are intended to be illustrative and not restrictive. Many suitable components, steps, and materials that would perform the same or similar functions as the components, steps, and materials described herein are intended to be embraced within the scope of the disclosed technology. Such other components, steps, and materials not described herein can include, but are not limited to, similar components or steps that are developed after development of the disclosed technology.

A universal and unified control (UniCon) strategy for power electronics converters ("converters") that are configured to operate connected to a grid are presented herein.

FIG. 1 is an is a flow diagram illustrating structure a converter control structure 100. Utility/owner commands 102 are provided to an upper-level control layer 104 which can perform transactive control, forecasting, and/or energy management for example. The upper-level control layer 104 can provide data and/or commands to the middle-level control layer 106 such as droop setting, grid synchronization, real power dispatch, and/or reactive power dispatch, for example. The middle-layer control level 106 can provide inertia support, dynamic management of real or reactive power, black-start microgrid control, managing transients, and/or rapid settling to new setpoints, for example. The middle-layer control level 106 can provide data and/or commands to the lower-level control layer 108. The lower-layer control level 108 can control inner current loops, inner voltage loops, and/or modulation, for example. The lower-level control layer 108 can provide switching signals 110 to electronics of the converter.

In some embodiments, a converter controller can be implemented in the middle-level control layer 106. In some embodiments, real-time control of the converters can be completely based on local measurements and rules which allow converters to collaborate and to handle the wide range of steady state, transient, and fault conditions that the converters may experience.

Figure 2:
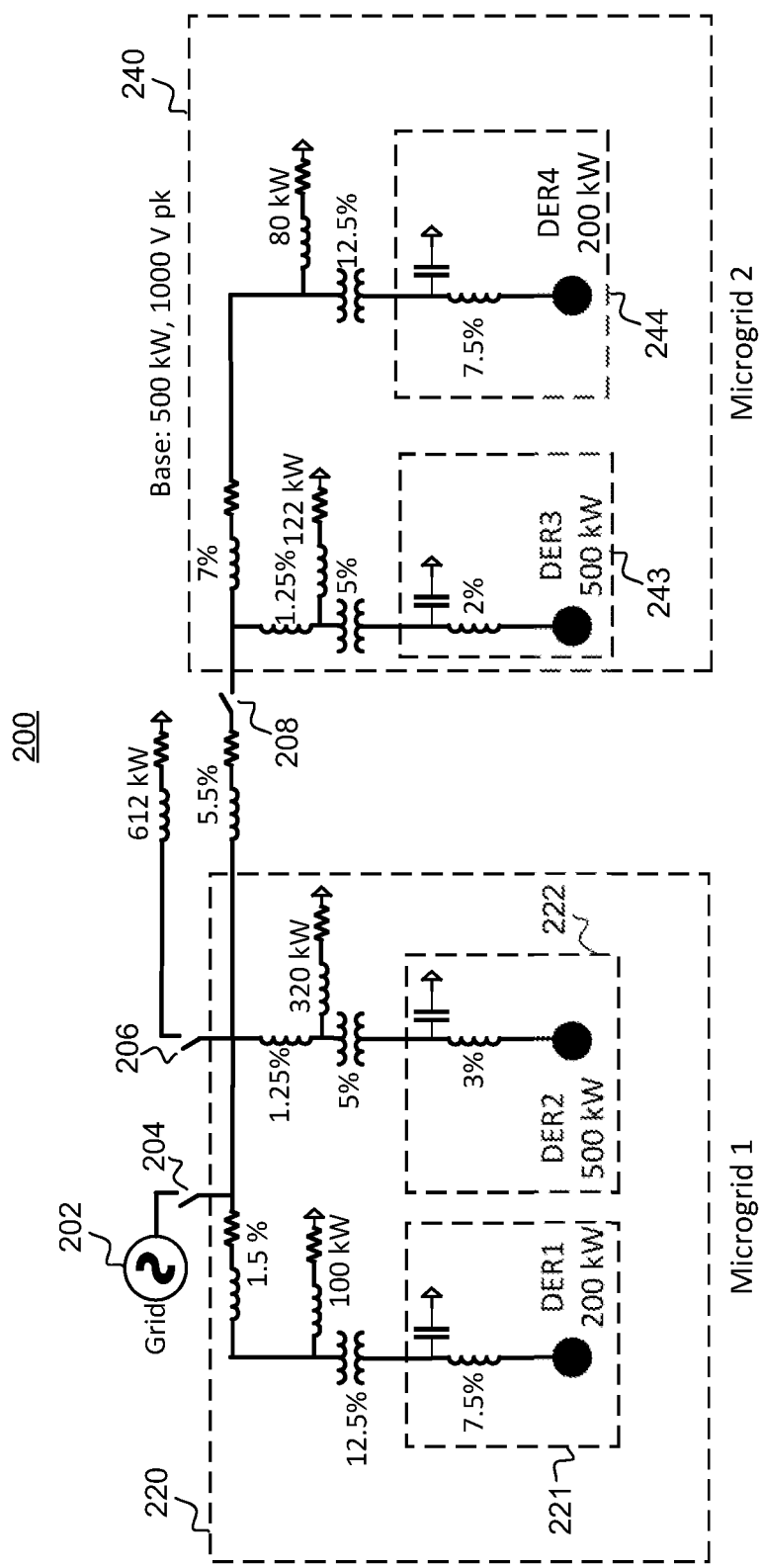
FIG. 2 is an electrical schematic of a model of an example grid according to aspects of the present invention.

FIG. 2 is an electrical schematic of a model of an example grid 200 to illustrate example technical requirements for the UniCon strategy. A 2 MW distribution feeder 202 is shown with a first microgrid 220 and a second microgrid 240 that can each operate in grid connected or grid islanded modes (i.e. through opening or closing of switch 208). Each microgrid 220, 240 is connected to two converter-based distributed energy resources (DERs) 221, 222, 243, 344 that allow each microgrid 220, 240 to function in grid-connected, grid-islanded, and microgrid-cluster modes. The DERs 221, 222, 243, 344 can be based on photovoltaics (PV) and storage, for example.

The main grid 202 itself is powered by a synchronous generator with an short-circuit ratio (SCR) of 20 and an inertia constant (H) of 6 seconds. Further there may be a backup generator that is partially rated. The system is geographically dispersed (resilient community) and is assumed to have slow communication, which may sometimes be interrupted—but the grid and microgrid should continue to function—possibly in a sub-optimal manner. Bottom-up black start should be possible for each microgrid 220, 240, and for connection of the distribution feeder switch 206 when the transmission feed 202 is lost (i.e. switch 204 is open). Finally, while there is general information available on the network and sources/loads, real-time accurate information cannot be assumed.

This is a typical real-life resilient feeder problem and poses many challenges to the traditional way we have controlled converters and microgrids. When grid-connected, the DERs 221, 222, 243, 244 operate in dispatch mode, operating to maximize energy transfer from the PV, optimizing usage of energy storage resources, and providing support to the grid using Volt/VAR support or frequency regulation services. For scheduled disconnect or disconnect caused by a grid side fault, the microgrids 220, 240 continue to operate, balancing load with generation, typically using a power-frequency droop characteristic. Operation in microgrid mode can occur with or without the backup gas generator, and with or without PV, and occur as two single microgrids or a clustered microgrid. However, many of these corner cases pose significant problem, especially as there is no communication between converters, there is poor knowledge of the system, and control is based on local measurements and a common set of rules. Key corner cases include:

Inertial support to the grid under high rate of change of frequency (ROCOF) conditions
Connection of converter to operating grid with minimal transients
Connection of operating microgrid to grid with minimal transients
Interconnection of two microgrids with each other with minimal transients
Rapid settling of system to P-F curve with minimal transients following generation/load changes
Dynamic management of P and Q, especially during transients (Q also in steady state)
Manage post-fault or other condition induced phase jump
Black-start microgrid and to form a bottom-up microgrid cluster
Interconnect microgrids/grid at different frequency and phase without major transients Example embodiments of a controller are presented herein that use elements of rapid phase jump for large disturbances, dynamic virtual impedance under transients, a nonlinear variable inertia implementation, and sub-combinations thereof to realize a single control strategy that manages steady state and transient requirements, including some or all of the challenging issues identified above. In some embodiments, the grid voltage is used as the key instantaneous parameter that the converter acts against.

A major objective for UniCon is to be applicable across a wide range of converter topologies and system/network applications—ranging from large voltage source converters (VSCs) connected to transmission all the way to microgrids and microgrid clusters. In some embodiments, an objective of the UniCon strategy is to be agnostic to the vendor and to the implementation of the inner voltage/current and protection loops (i.e. lower-layer control level 108). In some embodiments, most of the UniCon control is slower that typical converter inner loops and aims at achieving universality. In some embodiments, an objective of the UniCon strategy is to create interoperability for all types, ratings and brands of converters that are connected to the grid. In some embodiments, an objective of the UniCon strategy is to facilitate further penetration of converters connected to the grid.

Figure 3:
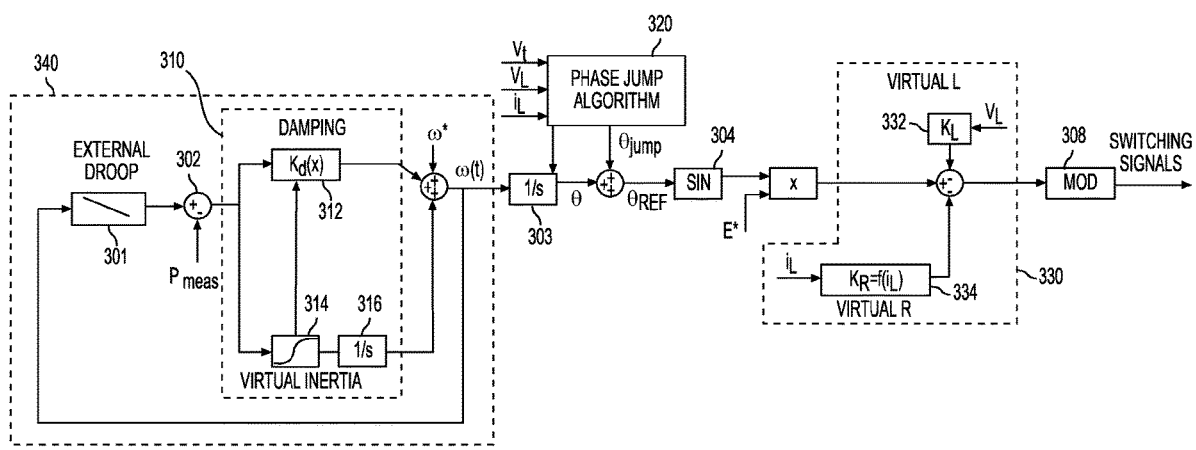
FIG. 3 is block diagram of an embodiment of the UniCon strategy according to aspects of the present invention.
Figure 16A:
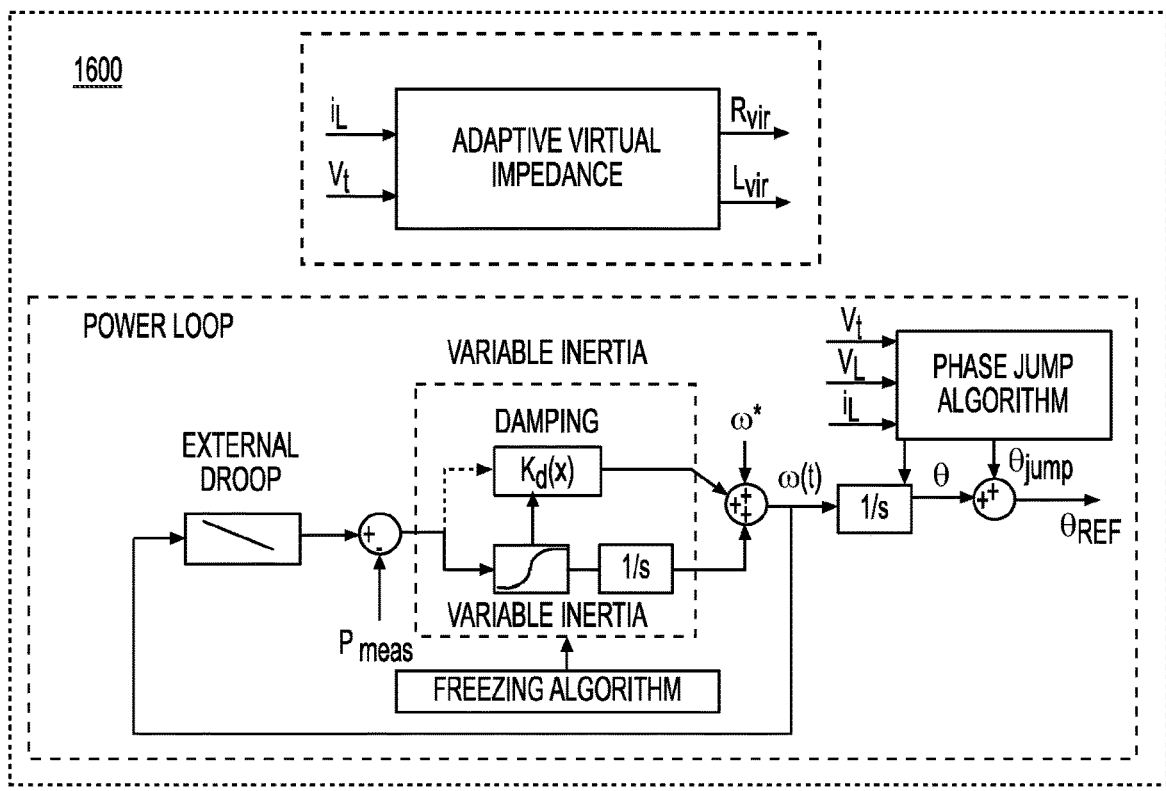
FIG. 16A is a block diagram of another embodiment of the UniCon strategy according to aspects of the present invention.

FIG. 3 is block diagram of an embodiment of an implementation 300 of the UniCon strategy, wherein the UniCon strategy includes a phase jump module 320, an adaptive inertia module 310, and a virtual impedance module 330. A block diagram of an embodiment of the UniCon strategy 1600 is illustrated in FIG. 16A. The phase jump module 320 can be configured to achieve voltage phase synchronization quickly upon interconnection of the converter to a grid, a microgrid, and/or a grid forming converter (GFC). In some embodiments, the phase jump module 320 can determine a phase angle jump $\theta_{jump}$ to thereby set a reference voltage phase $\theta_{REF}$ of the power converter in response to a terminal voltage waveform of the power converter abruptly moving out of sync with a reference voltage waveform of the power converter. The adaptive inertia module 310 can be configured to set an inertia constant of the power converter to synchronize converter frequency with a grid, a microgrid, and/or GFC. In some embodiments, the adaptive inertia module is configured to set an inertia constant of the converter based at least in part on a power different between terminal power of the power converter and reference power of the converter. The virtual impedance module 330 can be configured to limit current of the power converter in a fault ride through mode. In some embodiments, the virtual impedance module dynamically varies an effective output impedance of the power converter.

The UniCon strategy can further include a droop control module 301. In some embodiments, the droop control module 301 can utilize an inverse relationship between active power and frequency or other suitable droop control strategy as understood by a person skilled in the pertinent art.

The droop control module 301 can set the reference power for the converter. An error between the reference power (internal to the converter) and the actual power (output, terminal power of the converter, $P_{meas}$) is computed by a summation function 302 and is fed to a non-linear integrator 314, 316 of an adaptive inertial module 310 which also includes a non-linear damper 312. The outputs of the non-linear integrator 314, 316 and nonlinear damper 312 are frequency (angular frequency) which are summed up with the nominal angular frequency ($\omega^*$) of the converter. The output angular frequency ($\omega(t)$) of the frequency loop 340 is then passed through an integrator 303 to generate phase angle ($\theta$) of the reference voltage waveform of the converter. A phase jump algorithm of the phase jump module 320 directly affects the phase of the internal converter voltage (E), skipping the frequency loop 340, hence resulting in a zero inertia response. The virtual impedance module 330 allows decoupling between active and reactive power control. The virtual impedance module 330 also indirectly allows reactive power control. The virtual impedance module 330 modifies the internal converter voltage reference to emulate series R and series L. The reference voltage phase $\theta_{REF}$ (determined by the phase jump module 320 and frequency loop 340) along with the nominal voltage magnitude (modified by the virtual impedance module 330) forms the reference voltage waveform of the converter. Frequency of the converter reference voltage waveform is allowed to drift to synchronize to the terminal voltage waveform as regulated by the adaptive inertia module. The end results of the control block is the reference voltage waveform which can be fed to a converter switching algorithm in a lower-level control module 308. In some embodiments, the lower-level control module 308 functions similarly to the lower level control module 108 illustrated in FIG. 1.

The synchronization process for microgrids can be very challenging and, with prior strategies, typically requires a precise and time consuming coordination. In one strategy, the synchronization process is initiated by assuming that initial power of converter is zero and then it ramps-up after grid connection. For instance, virtual impedance is changed in an exponential manner so that the current is effectively controlled during synchronization. In another instance, a switching-based technique is used that allows the converter to synchronize before ramping up the current. In many cases, however, the microgrid is operational and it is not possible to shut down the system for synchronization purposes. Another strategy requires perfect knowledge of grid voltage for seamless transition. While it is possible to do the synchronization for connection of an individual unit to the system (since the grid voltage is available and could be sensed), in a geographically-disperse microgrid, many converters do not have access to the grid voltage, and no method independent of supervisory algorithms has been previously proposed that allows seamless connection of a microgrid in a fully distributed manner. In some embodiments the phase jump module 320 provide such a feature. In some embodiments, the phase jump module 320 may enhance the performance of single converters and make them "plug-and-play" devices. In some embodiments, the phase jump module 320 may make the concept of "fractal grid" possible, which means the grid can break down into smaller sections during a major transient and quickly recover after fault clearance.

In one embodiment of the UniCon strategy, the synchronization process can be achieved in two parts: initial phase synchronization to limit voltage/current transients and then the frequency synchronization. The phase synchronization can be facilitated by the phase jump module 320. The frequency synchronization can be facilitated by the adaptive inertia module 310.

In some embodiments, the phase jump module 320 can be configured to achieve rapid voltage phase synchronization, resulting in minimal current transients on grid interconnection.

In some embodiments, the phase jump module 320 includes a phase jump algorithm configured to directly control the voltage angle of an internal voltage waveform of the converter to effectively limit the current and move the system to the same phase as the grid through a zero inertia response. Such behavior is not possible with existing strategies, which typically rely on current limiting algorithms that can lead to current loop saturation and sustained transients.

Figure 4A:
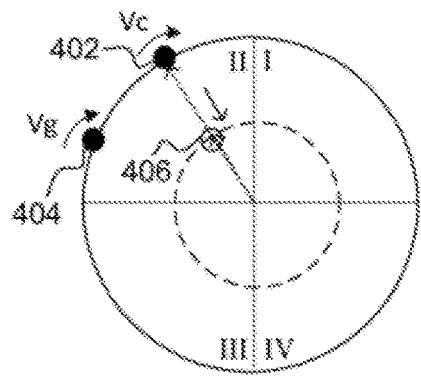
FIG. 4A is a conceptual diagram of a voltage phasor movement after interconnection in case of traditional methods based on current loops.
Figure 4B:
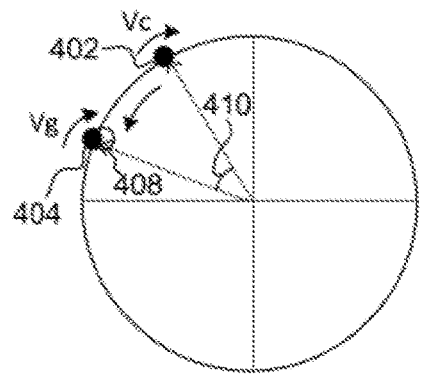
FIG. 4B is a conceptual diagram of a voltage phasor movement after interconnection according to the UniCon scheme according to aspects of the present invention.

FIGS. 4A and 4B each include a conceptual diagram of a voltage phase movement to minimize current transients on connection to the grid in which FIG. 4A illustrates a traditional strategy and FIG. 4B illustrates an aspect of the UniCon strategy. As illustrated in FIG. 4A, the traditional approach relies on equalizing the voltage magnitude of the converter (Vc) with the grid voltage (Vg). As illustrated, the converter is at an initial voltage magnitude 402, and the converter voltage is moved to a new position 406 on the diagram, to limit the current from the converter. However, at the new position 406, the reference voltage waveform remains out of phase with the phase of the grid/terminal voltage waveform. Though this approach minimizes current spikes during the interconnection, the transients persists for a while as the converter tries to equalize its magnitude and phase with the grid. In contrast, an approach utilized by the UniCon strategy illustrated in FIG. 4B changes the phase of the converter voltage which not only reduces instantaneous current spikes but also minimizes the transients after the phase synchronization. The position 402 of the converter voltage moved through an angle 410 to a new position 408 that has the same phase angle as the position 404 of the grid voltage. In the traditional approach (FIG. 4A), the converter never changes the direction (always clockwise). In the approach of certain embodiments herein (FIG. 4B), the converter may reverse the direction based on the difference between Vc and Vg. In some embodiments, the phase is changed in an exponential (non-linear) way to avoid oscillations.

Figure 5A:
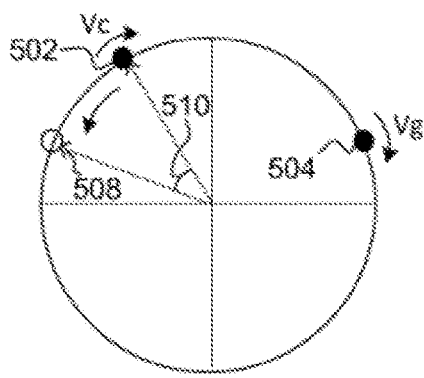
FIG. 5A is a conceptual diagram of a simple phase jump to reduce transients when a converter and grid have same voltages but different phases.
Figure 5B:
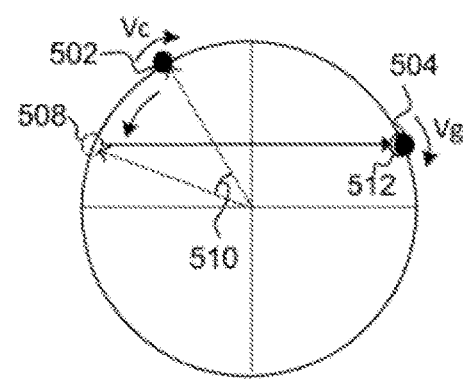
FIG. 5B is a conceptual diagram of a phase jump followed by a quad jump to reduce transients when a converter and grid have same voltages but different phases.

FIGS. 5A and 5B each include a conceptual diagram illustrating a sequence of a voltage phase movement including a quadrature jump. FIG. 5A illustrates a scenario in which the approach illustrated in FIG. 4B results in the converter voltage and grid voltage being in opposite halves. In this scenario Vc moves from a first position 502 through an angle 510 to a second position 508 that is equal in magnitude to the position 504 of Vg. In this scenario, Vc and Vg are of not the same phase, leading to increased transients. To address this issue, the concept of quadrature jump is introduced, where the voltage phase jumps to its supplementary value to control the current. FIG. 5B illustrates Vc moving from the second position 508 to a third position 512 at a supplementary value in an opposite quadrature, converging with the position 504 of Vg.

In some embodiments, the UniCon strategy is capable of detecting the need for phase jump, picking the right direction for the phase change, the magnitude of phase change at each time step, and the need for quad jump.

FIGS. 4B, 5A, and 5B illustrate only two possible scenarios. The UniCon strategy can be configured to synchronize a reference voltage phase to a terminal voltage phase according to the strategies illustrated in FIGS. 4B, 5A, and 5B.

Figure 6:
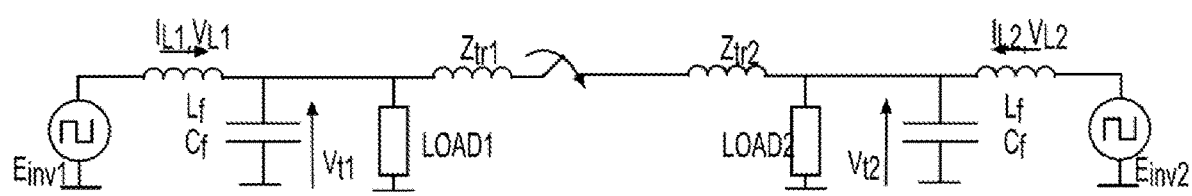
FIG. 6 is an electrical schematic of a model of two grids each powered by a grid forming converter according to aspects of the present invention.

FIG. 6 is an electrical schematic of a model of a two grids each powered by a GFCs, a basic two GFC system, to illustrate aspects of the UniCon strategy from the perspective of one of the GFCs. The second GFC in the model may also represent a grid. The GFC can include the UniCon strategy 300 diagrammed in FIG. 3 at a middle-level control layer 106 as illustrated in FIG. 1.

Figure 7A:
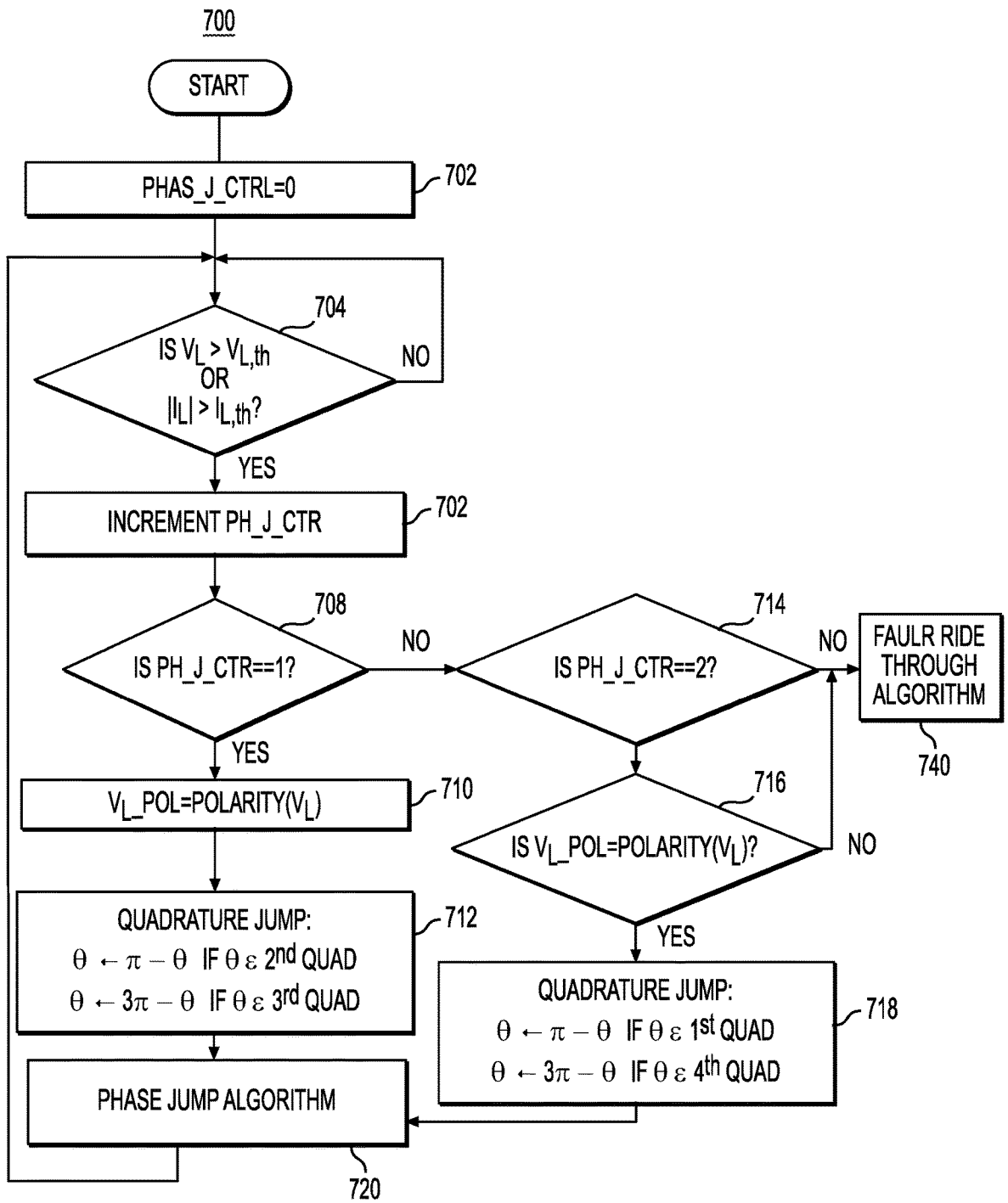
FIG. 7A is a flowchart of an algorithm activated to initiate a phase jump algorithm according to aspects of the present invention.
Figure 7B:
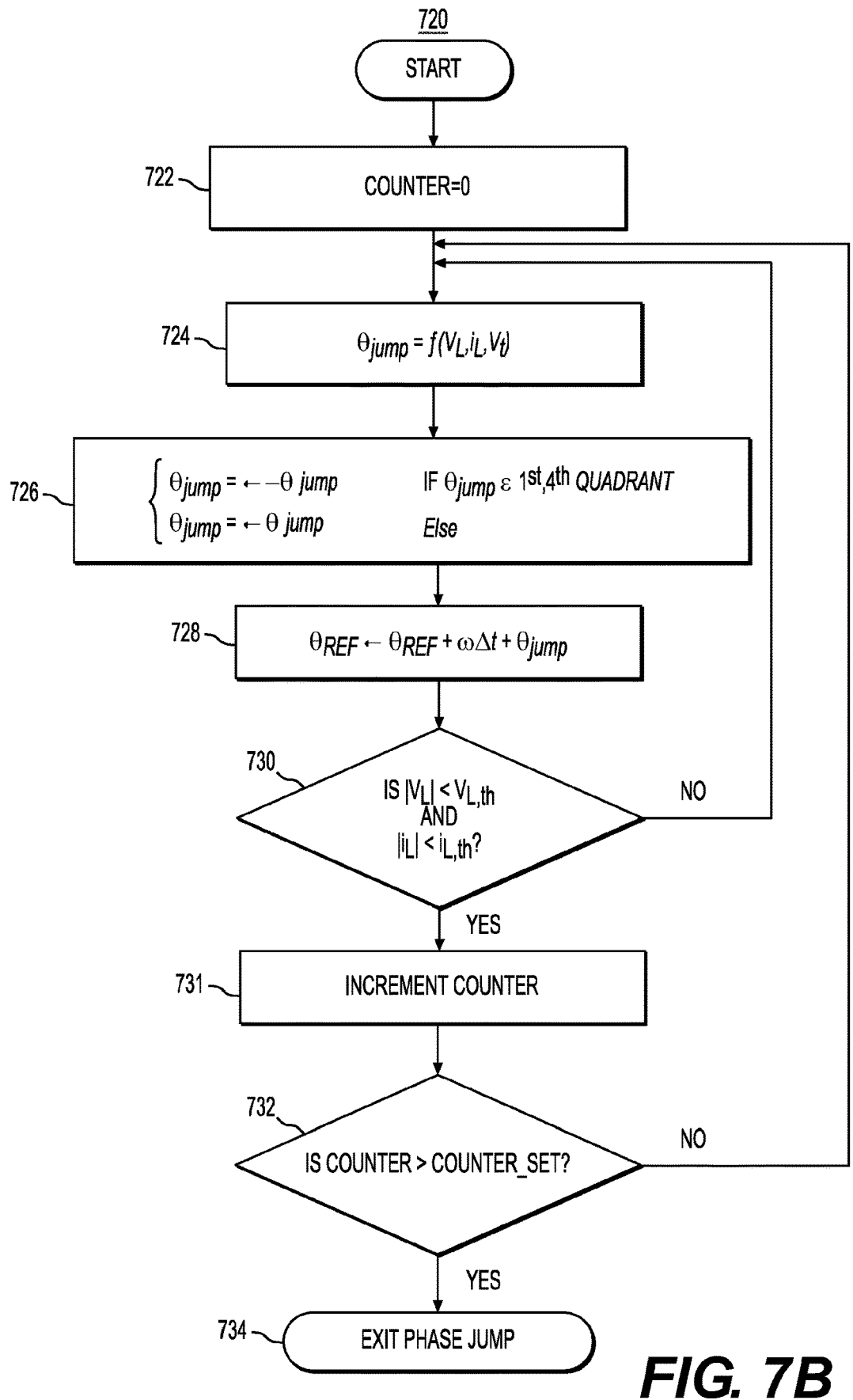
FIG. 7B is a flowchart of a phase jump algorithm called by the algorithm illustrated in FIG. 7A according to aspects of the present invention.

FIG. 7A is a flowchart of an algorithm 700 activated to initiate a phase jump algorithm 720 illustrated in FIG. 7B. The flowchart represents an algorithm that can be performed by either of the GFCs illustrated in FIG. 6 without communication to the other GFC. For the sake of illustration, the subscript "1" and "2" are omitted from $V_{L1}$, $V_{L2}$, $I_{L1}$, $I_{L2}$, $V_{t1}$, and $V_{t2}$ in FIGS. 7A and 7B.

At block 702, an algorithm control counter variable (Phase_j_ctrl) can be set to zero.

At block 704, the algorithm 700 can become activated when the inductor current ($I_L$) or inductor voltage ($V_L$) goes beyond a threshold value ($V_{L,th}$, $I_{L,th}$), e.g. 1.5 pu, at which point the algorithm 700 progresses to block 706, otherwise block 704 repeats. In some embodiments, the algorithm 700 can include a delay before proceeding to block 706 for the purposes of noise rejection. For instance, the algorithm 700 can include a counter at block 704, that once reaches a threshold, results in the algorithm proceeding to block 706.

At block 706, the algorithm control counter variable (Phase_j_ctrl) is incremented by one.

At block 708, if the value of algorithm control counter variable (Phase_j_ctrl) is equal to one, then the algorithm 700 proceeds to block 710, otherwise, the algorithm proceeds to block 714.

At block 710, an inductor voltage polarity variable ($V_{L\_pol}$) is set equal to the polarity of the inductor voltage ($V_L$). Alternatively, blocks 710 and 716 can be omitted.

At block 712, the quadrant of the converter internal voltage phasor (θ), reference phase angle, is determined. If the internal voltage phasor (θ) is in the second or third quadrant, the phasor (θ) will jump to its supplementary value in the first or fourth quadrant.

At block 720, the phase jump algorithm 720 is initiated.

FIG. 7B is a flowchart of the phase jump algorithm 720 called by the algorithm illustrated 700 in FIG. 7A. The phase jump algorithm 720 can force the reference voltage phase ($θ_{REF}$) to be changed in an optimal trajectory to reduce the magnitude of inductor voltage ($V_L$) or inductor current ($I_L$).

At block 722, a counter is set to zero.

At block 724, a phase angle jump ($θ_{jump}$) that is an angular adjustment that is calculated based on a function of inductor voltage ($V_L$), inductor current ($I_L$), and output voltage ($V_t$). Two example approaches for calculating this trajectory are presented as non-limiting examples.

Approach 1: The objective in this approach is to minimize |(E−$V_t$)| and limit |I|<$I_{max}$. In this approach, a polynomial function (like tanh (x)) whose argument is the inductor voltage is used to drive the phase. Consider the basic equation of the converter:

$$E \sin (θ(t) + θ_{jump}(t)) = V_t + L\frac{di}{dt} \quad (1)$$

where $V_t$ is the terminal voltage, E is the magnitude of converter internal voltage, L is the filter inductance, i is the inductor current, θ(t) is the angle generated by the frequency loop 340 and $θ_{jump}$(t) is the input coming from the phase jump module 320. Defining $θ_{jump}$(t) as below causes E and $V_t$ to converge in a fast and smooth manner.

$$θ_{jump}(t) = -k \times \tanh(E - V_t) \quad (2)$$

Approach 2: The objective in this approach is to minimize |I| and limit |(E−$V_t$)|<Δ. In this approach, a state feedback control is applied to limit currents, as explained below. Again, consider the basic equation of the converter in Eq. 1 If u(t) is defined as:

$$θ_{jump}(r) = -θ(r) + \sin^{-1}\left[sat\left(\frac{-ki(t) + V_t}{E}\right)\right]. \quad (3)$$

Then, the dynamics of the system become:

$$i(t) = -\frac{k}{L}i(t) \Rightarrow i(t) = I_0 e^{\left(-\frac{k}{L}t\right)}, \quad (4)$$

which means the current can effectively be controlled by controlling the reference voltage phase.

At block 726, if the angular adjustment ($θ_{jump}$) is in the 1$^{st}$ or 4$^{th}$ quadrant, the angular adjustment ($θ_{jump}$) is set to its negative value.

At block 728, the reference voltage phase ($θ_{REF}$) is set to a sum of its previous value, angular frequency times a sampling time (Δt), and the angular adjustment ($θ_{jump}$).

At block 730, the inductor current ($I_L$) and inductor voltage ($V_L$) are compared to their respective threshold values ($V_{L,th}$, $I_{L,th}$). If both are below their respective threshold values, then the phase jump algorithm 720 proceeds to block 731 and the counter is incremented. Note that the loop of the phase jump algorithm 720 is configured to move the reference voltage phase $θ_{REF}$ in a direction that reduces $V_L$ and $I_L$. Even if there is a very dramatic fault, e.g., $V_t$=0, then the reference voltage phase $θ_{REF}$ goes all the way down to zero to make $V_L$ close to zero. Then condition in 730 will be met and the phase jump algorithm 720 starts counting.

At block 731, the counter is incremented.

At block 732, the counter is compared to a counter threshold (counter set). If the counter is greater than the counter threshold, then the phase jump algorithm 720 proceeds to block 734 and the phase jump algorithm 720 is exited. If the counter is less than the counter threshold, then the phase jump algorithm 720 proceeds to block 724 and the loop repeats.

Returning to the main algorithm 700 in FIG. 7A, once the phase jump algorithm 720 is exited at block 734, the main algorithm 700 proceeds to block 704.

At block 704, if either the inductor current ($I_L$) or inductor voltage ($V_L$) are greater than their respective a threshold value ($V_L$,th, $I_{L,th}$), the main algorithm 700 proceeds to block 706. Note that the condition at block 704 is initially false upon exiting the phase jump algorithm 720; however the loop continues to run. If the change to the reference voltage phase by the phase jump algorithm 720 does not result synchronization of the reference voltage waveform to the terminal voltage waveform, then the current and/or voltage ($I_L$ and/or $V_L$) will rise again soon and the condition of block 704 will become true. The Ph_j_ctr value is predetermined to result in the loop being executed a number of times to increase confidence that rise in current and/or voltage ($I_L$ and/or $V_L$) is addressed.

At block 706, the control counter variable (Phase_j_ctrl) is incremented by one, and is equal to two on the second time through the loop.

At block 708, because the control counter variable (Phase_j_ctrl) is not equal to one on the second time through the loop, the algorithm 700 proceeds to block 714.

At block 714, because the control counter variable (Phase_j_ctrl) is equal to two, the method proceeds to block 716, otherwise the method 700 proceeds to block 740.

At block 716, the inductor voltage polarity variable ($V_{L\_}$pol) is compared to the polarity of the inductor voltage ($V_L$). If they are equal, the method 700 proceeds to block 718, otherwise the method proceeds to block 740. Alternatively, blocks 710 and 716 can be omitted.

At block 718, the quadrant of the converter internal voltage phasor ($\theta$), reference phase angle, is determined. If the reference voltage phase ($\theta$) is in the first or fourth quadrant, the reference voltage phase ($\theta$) will jump to its supplementary value in the second or third quadrant. The method then proceeds to the phase jump algorithm 720 as illustrated in FIG. 7B.

At block 740, a fault ride through algorithm is initiated, which engages the virtual impedance module 330. The fault ride through algorithm is therefore initiated upon completion of more than two loops of the main algorithm 700. In embodiments including optional blocks 710 and 716, the fault ride through algorithm can be initiated during the second loop when the polarity of $V_L$ has changed between the first and second loops through the main algorithm 700.

This procedure leads to a smooth re-connection of two or more microgrids. Nonetheless, if the other side is the stiff grid or the sharp rise of current is due to a fault, then additional steps are required to suppress the transients. In the first case (Ph_j_ctr=1 at block 708), under certain circumstances, i.e., grid voltage is in the second or third quarter (block 712), the voltage/current may exceed the limits and the phase jump algorithm 720 will be activated for the second time (Ph_j_ctr=2 at block 714 and proceeds to 720). This time, the phase jumps to the second/third quadrant (block 718) where the grid voltage vector is. If again the current rises for the third time (Ph_j_ctr=3), it means this is not a synchronization transient, but a fault situation. Therefore, the fault-ride-through algorithm (block 740) will be activated.

Once the current and the voltage are controlled, the main algorithm 700 ends, and the frequency loop control 340 (FIG. 3) takes the control of reference voltage phase ($\theta_{REF}$) again. At this instant, the angle on both sides (e.g. $E_{inv1}$ and $E_{inv2}$ in FIG. 6) is the same, but the frequency values are different. An adaptive inertia scheme of the adaptive inertia module 310 is utilized to minimize the transients due to different frequency values and converge them in a smooth manner.

Figure 8A:
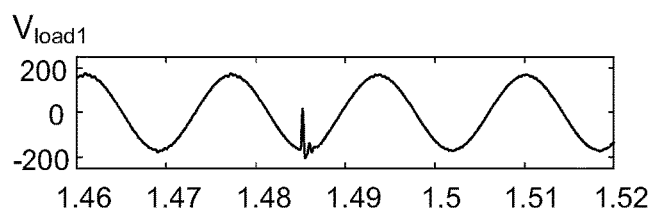
FIGS. 8A through 8G illustrate simulation results for two converter connection such that FIG. 8A is a plot of load voltage of a first converter.
Figure 8B:
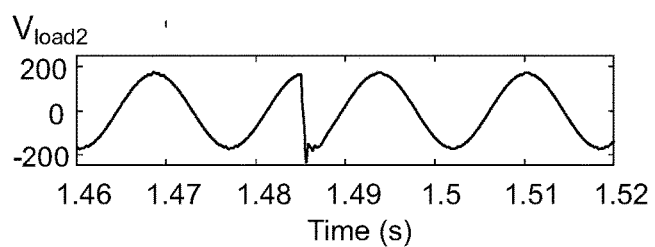
Figure 8C:
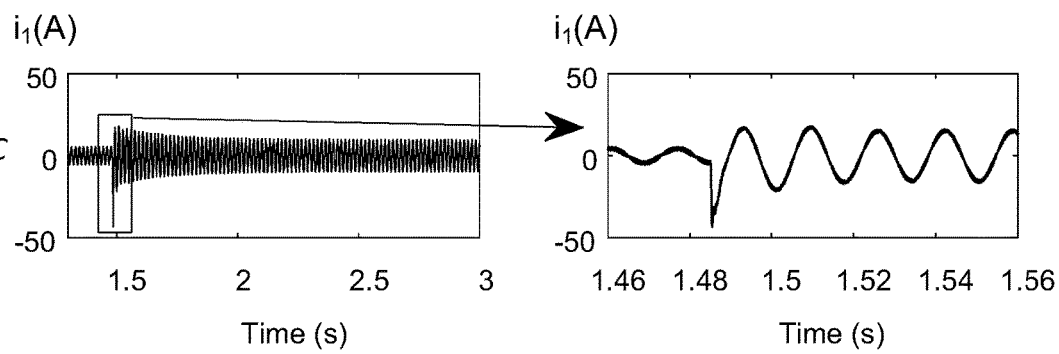
Figure 8D:
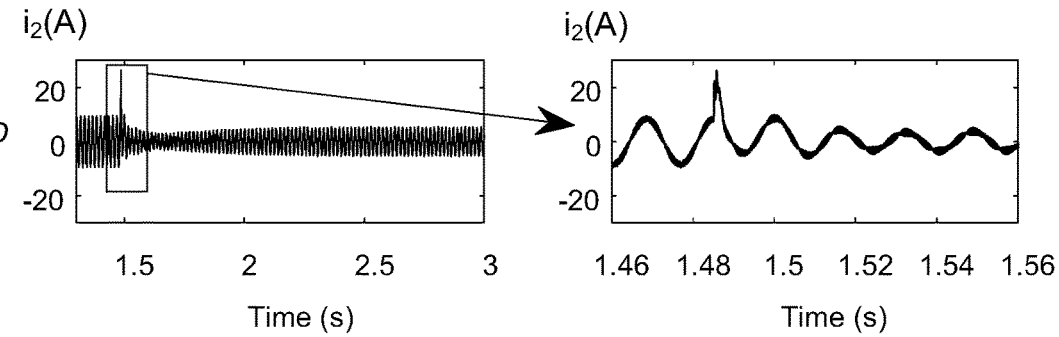
Figure 8E:
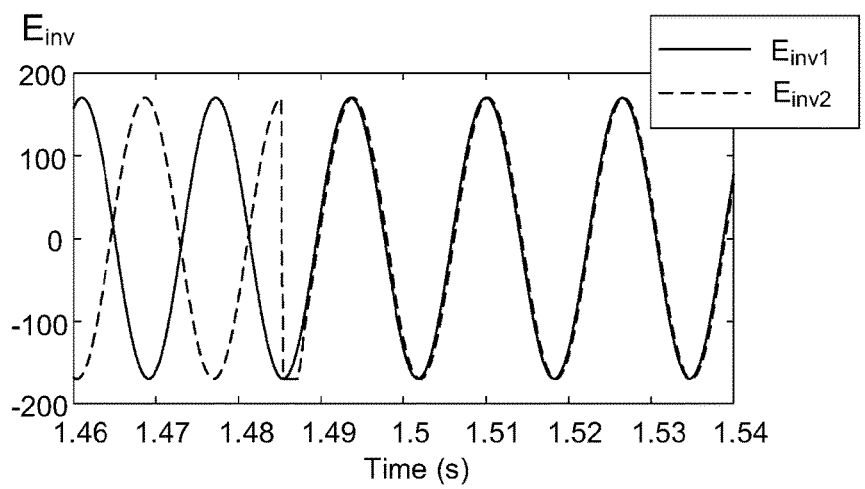
Figure 8F:
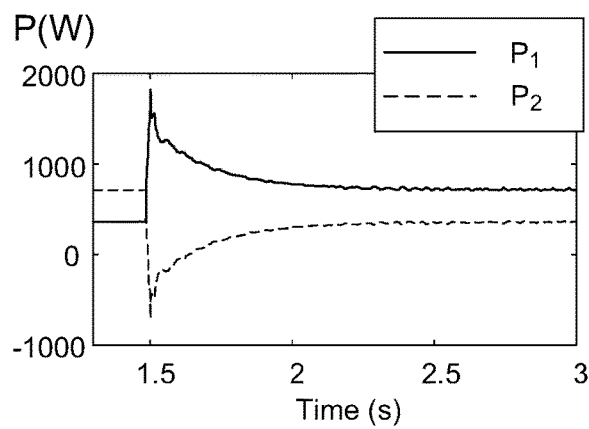
Figure 8G:
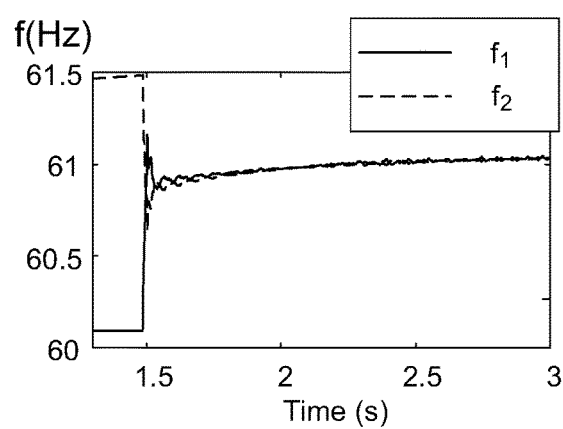

FIGS. 8A through 8G illustrate simulation results for two converter connection. To demonstrate the functionality of the algorithm 700 of the phase jump module 320, a two-converter system, shown in FIG. 6, is simulated in MATLAB Simulink. FIG. 8A is a plot of load voltage of a first converter. FIG. 8B is a plot of load voltage of a second converter. FIG. 8C is a plot of current of a first converter. FIG. 8D is a plot of current of a second converter. FIG. 8E is a plot of internal voltage of converters. FIG. 8F is a plot of output power of converters. FIG. 8G is a plot of converters frequency.

Every converter is feeding its own local load, and at t=1.485 s, the switch is closed. The rating of the first converter (120 V, 30 A) is two times bigger than of the second one (120 A, 15 a). As seen in FIGS. 8A-E, at the instant of connection, one converter is at its peak positive while the other is at its peak negative, hence the voltage across the inductors is maximum, i.e., 2 pu. In this case, since the size of converter 2 is smaller, it reaches its threshold faster and therefore it jumps to minimize the transient. FIGS. 8A and 8B demonstrate that the voltage across the loads go through some high-frequency transients for ⅛th of a cycle and then remains stable. FIGS. 8C and 8D demonstrate that the currents of both converters are within their peak ratings. Once the phase jump is completed by the phase jump module 320, the frequency loop 340 starts adjusting the frequency so that the power sharing follows the droop curves, as depicted in FIG. 8F and FIG. 8G. The results in total demonstrate the possibility of interconnection of two GFCs while limiting voltage and current transients.

In some embodiments, the synchronization process can include two parts: initial phase synchronization to limit voltage/current transients regulated by the phase jump module 320 and then the frequency synchronization regulated by the frequency loop 340 including an adaptive inertia module 314, 316 and nonlinear damping module 312. Regulation of the first part by the phase jump module 320 is disclosed above. Regulation of the second part by the frequency loop 340 including adaptive inertia module 314 and nonlinear damping module 312 is disclosed below.

Current state of the art grid forming techniques are mostly designed to mimic the behavior of synchronous generators (SGs) and are called virtual synchronous generator (VSG). VSGs, however, inherit the same weaknesses from SGs, such as oscillatory response during transients. Picking big values for virtual moment of inertia leads to better inertial support and effective limit of ROCOF, but in turn results in oscillations and slow response. Picking low values for J, on the other hand, makes the transient response faster but causes big overshoots and violation of permissible range of ROCOF.

In order to circumvent this issue, some have suggested "variable inertia" to effectively control frequency nadir and damp the oscillations. In one example, a bang-bang control scheme is used to change inertia constant based on values of $\Delta t$ and $d\omega_m/dt$. The issue is that the measurement of those values is non-trivial. Measuring $d\omega_m/dt$ requires suppression of noises amplified by the derivative function, while measuring $\Delta\omega$ requires knowledge of frequency on the grid side which is challenging, especially during transients. Also, the algorithm lets the system trajectory pass the desired setpoint and then takes action to improve the response which is not optimal.

More recently, others have improved the idea, by changing D and J simultaneously, or by introduction of a continuously changing J. The latter improves the control scheme by omitting the need for $d\omega_m/dt$ measurement, but its drawback is that the grid frequency is considered fixed and equal to 60 Hz. While that is the likely case for the grid-connected operation, in case of isolated microgrids where the frequency changes quite often, that is not an accurate assumption. Some experimental results have demonstrated that when the grid frequency is changed to other than nominal values, the response is very slow. An objective of some embodiments of the UniCon strategy aims to further improve the operation of VSG by introduction of a nonlinear adaptive inertia scheme that can dynamically vary the gains based on the system response. No measurement of grid frequency is required, and the system can damp the response and move optimally to the new operating point unrespectable of the grid frequency.

A large inertia constant (J) makes extra oscillations and small J leads to big frequency nadir. To avoid those issues, the UniCon strategy can make the system fast when the frequency is far away from the new setpoint (which could be any number), and gradually slow down the response as the system becomes closer to the new setpoint. This can be achieved by picking a nonlinear curve for J, where the values change in a smooth manner based on the error. Further, the damping coefficient (D) can be nonlinear. Polynomial functions are a good candidate that have this characteristic.

Figure 9A:
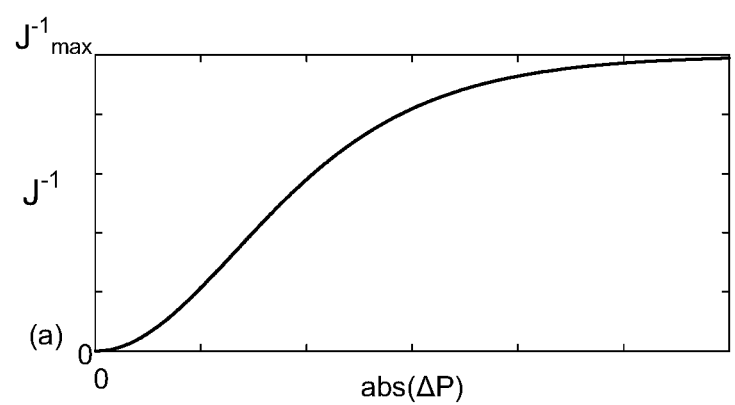
FIG. 9A is a plot of an inertia constant (J) that is nonlinear according to aspects of the present invention.

FIG. 9A is one example of inertia constant (J) that is nonlinear that is suitable for the variable inertia module 314 of the UniCon strategy 300. In some embodiments, the inertia constant (J) includes a polynomial function. Additionally, or alternatively, the adaptive inertia can be a function of two variables, i.e., Prated and ΔP, to help the converter not get overloaded.

Figure 9B:
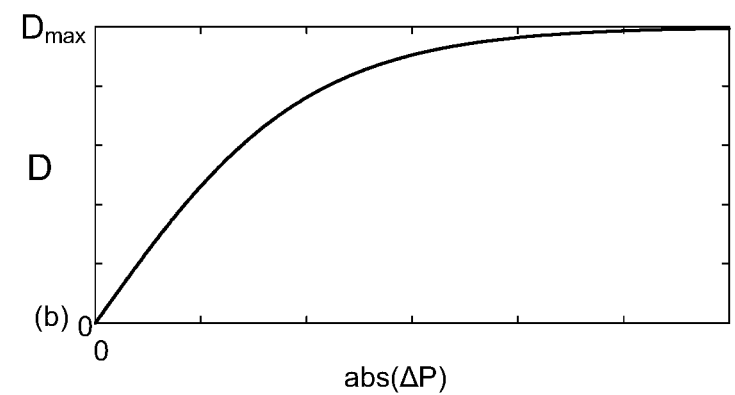
FIG. 9B is a plot of a damping coefficient (D) that is nonlinear according to aspects of the present invention.

FIG. 9B is one example of a damping coefficient (D) that is nonlinear. A virtual synchronous generator can be modeled by an RC circuit, where values of C and R are proportional to J and D. In this case, the swing equation is equivalent to the resonance that occurs between virtual C and inductive elements of the circuit. In an RLC circuit, to have a critically damped response for frequency, virtual R should be proportional to $$\sqrt{\frac{L}{C}},$$

hence D is picked to be $$\frac{K'_d}{\sqrt{J}},$$

where J itself is varying according to FIG. 9A. These two nonlinear variable gains help the system to demonstrate damped response during transients.

Figure 10A:
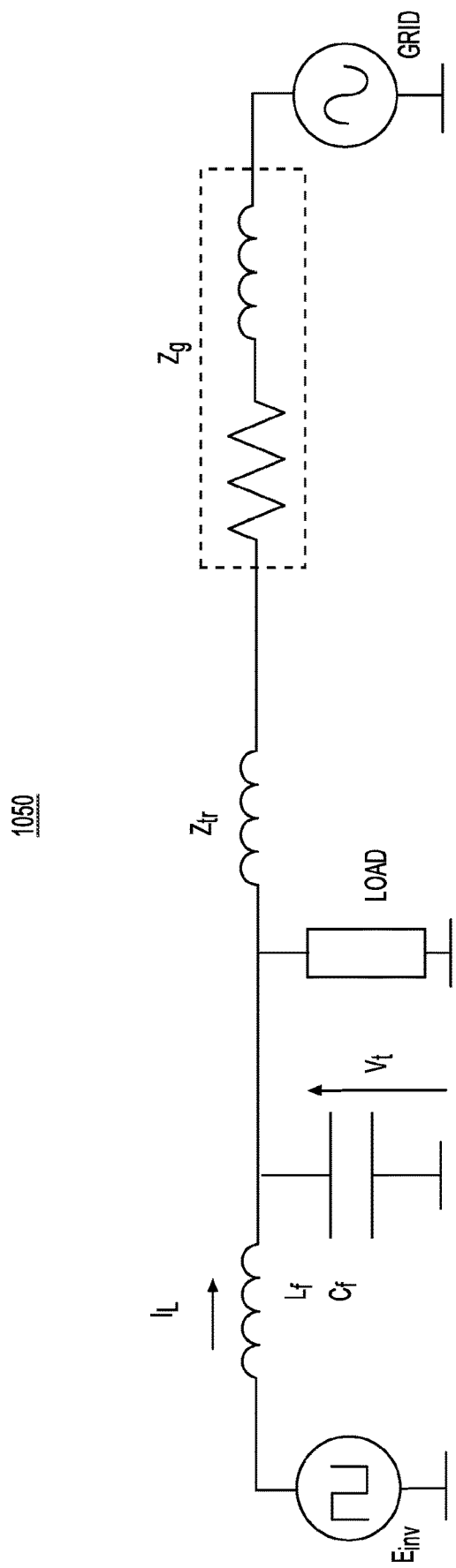
FIG. 10A is an electrical schematic of a model of an example grid according to aspects of the present invention.
Figure 10B:
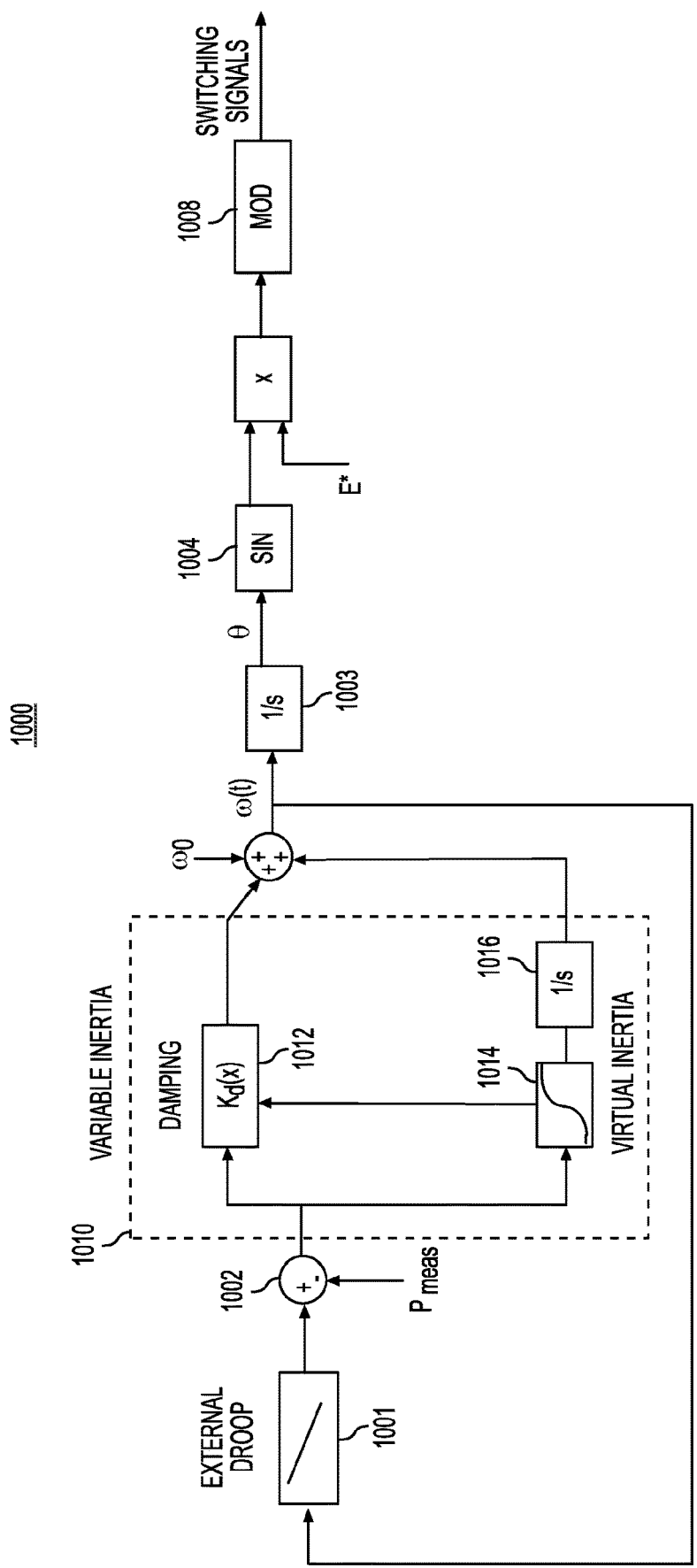
FIG. 10B is block diagram of an embodiment of the UniCon strategy according to aspects of the present invention.

FIG. 10A is an electrical schematic of a model of an example grid utilized to illustrate operation of an implementation 1000 of an embodiment of the UniCon strategy illustrated in FIG. 10B.

FIG. 10B is a block diagram of an implementation 1000 of an embodiment of the UniCon strategy with the phase jump module 320 and the virtual impedance module 330 omitted. The implementation 1000 includes a components and modules 1001, 1002, 1003, 1004, 1008, 1010, 1012, 1014, 1016 configured similarly to corresponding components and modules 301, 302, 303, 304, 308, 310, 312, 314, 316 illustrated in FIG. 3. The droop control module 1001 is employed to move the system to the new steady operating point after initial fast transient.

To see the efficacy of the variable inertia scheme, the system illustrated in FIG. 10A and control scheme illustrated in FIG. 10B are simulated in MATLAB Simulink. The scenario is as follows: at t=1 s, a step change in grid frequency occurs and frequency jumps from 60 Hz to 60.3 Hz. Then at t=2 s, the grid frequency changes back to the nominal value. One practical example for this scenario is when two or more grid-forming converters are isolated by fault, and after fault clearance they need to synchronize and connect together again. In such scenario, the frequency drift between grid-forming converters may happen and they might effectively observe a frequency step change on their terminal.

Figure 11A:
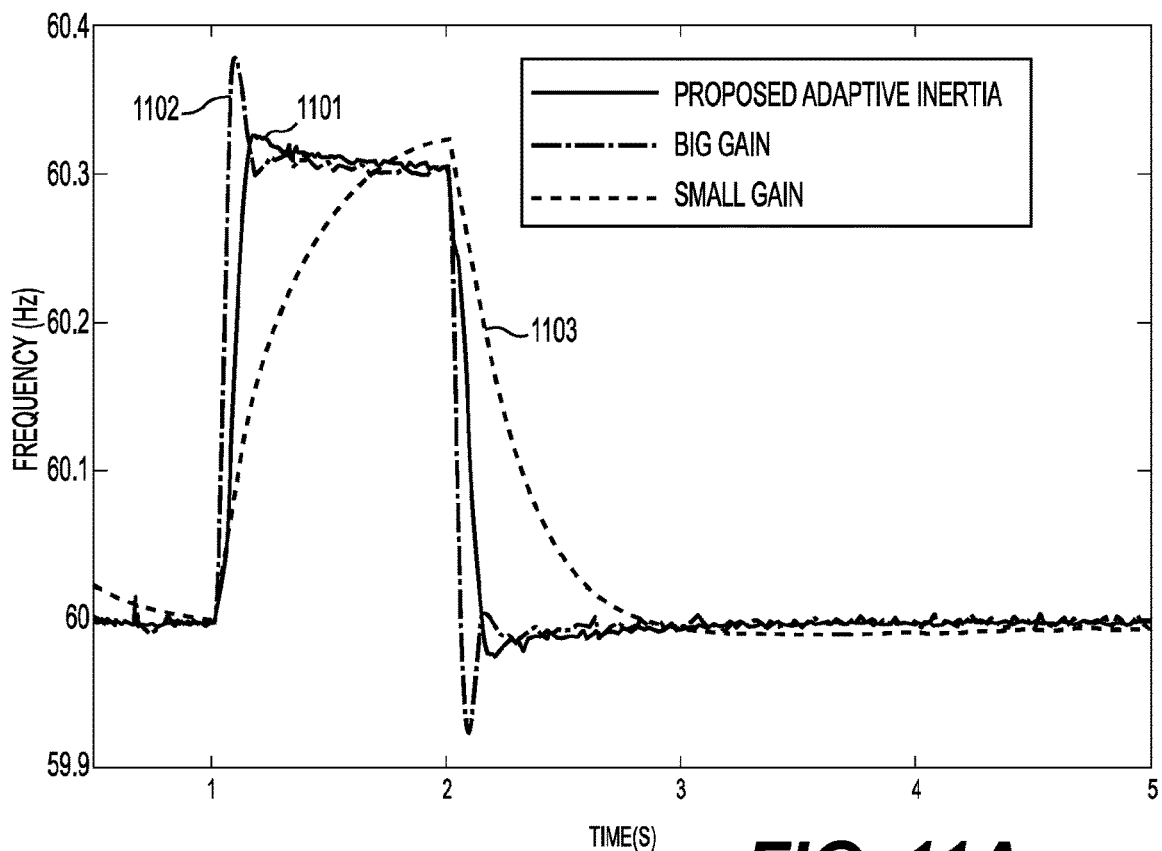
FIGS. 11A and 11B illustrate simulation results for an adaptive inertia scheme for an embodiment of the UniCon scheme such that FIG. 11A is a plot of adaptive gain and constant gain.

FIG. 11A illustrates the results for small gain 1103, big gain 1102, and adaptive inertia 1101. As can be seen, the variable inertia scheme shows a damped response, where the move is fast when the error is big, but slows down as it becomes closer to the setpoint.

Figure 11B:
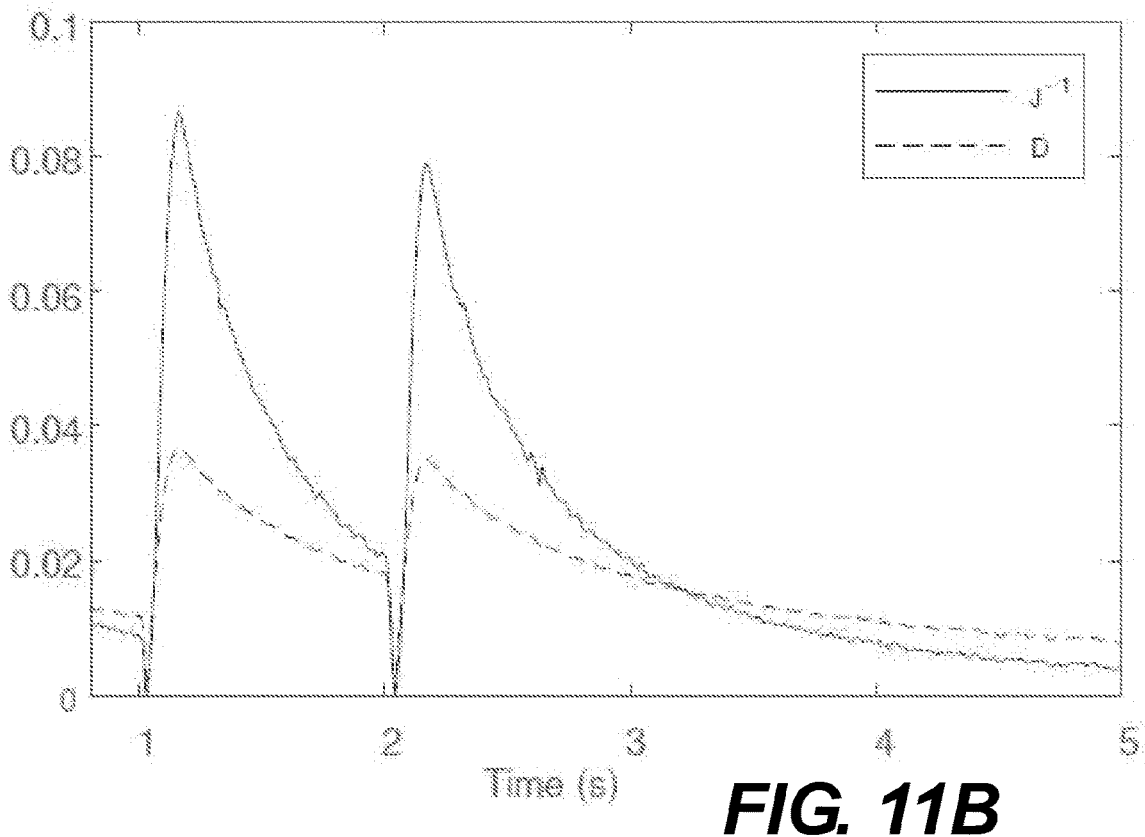

FIG. 11B illustrates how the inertia and damping gains change based on the response. Because of the nonlinear varying inertia, the step response characteristic of the system is superior to that of the constant gains as it does not come with compromises that designer needs to make when constant gains are used.

Another important element of a converter control is the ability to ride through fault and support the grid by providing enough current. To achieve that, variable virtual resistor 334 is employed. This method helps the converter to avoid entering the saturation mode and behave in its linear range. When there is a fast transient in the system, UniCon 300 tries to manage it first by using the phase jump module 320. If not successful upon a few attempts, then the algorithm 700 detects it as a fault condition and engaged the fault ride through algorithm 740 which increases the virtual resistor 334 to limit the current. Once the voltage returns to its normal value, the virtual resistor 334 decreases again to its nominal value. The virtual inductor 332 in steady state allows decoupling of P and Q, and for better power sharing during initial transients. The virtual inductor, during transients, might change to allow the system to inject stable and sinusoidal current.

The virtual resistor consists of two terms: $R_{inst}$ and $R_{flt}$. $R_{inst}$ rapidly changes to limit the instantaneous current, so that semiconductor switches are protected. $R_{flt}$ changes along with the virtual inductor based on an integrator to enable converters to inject stable current during fault.

Figure 12:
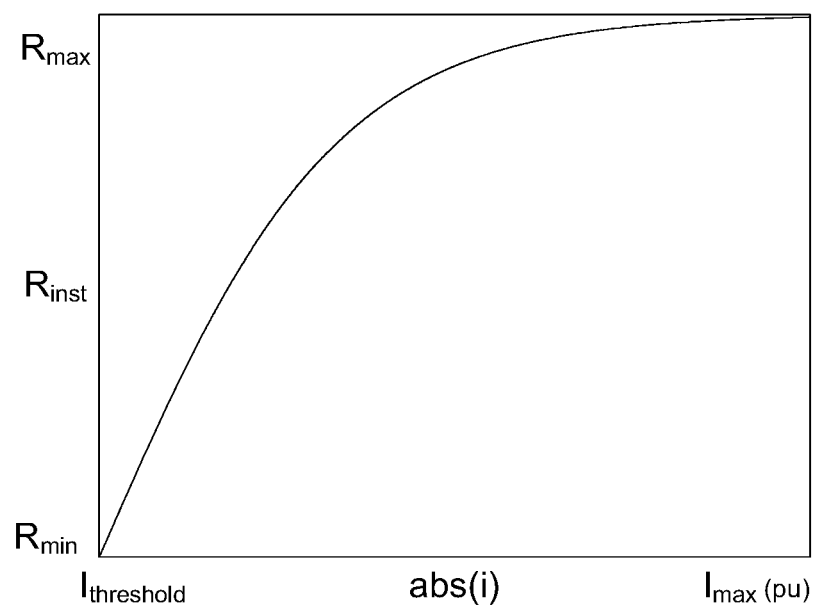
FIG. 12 is a plot of a virtual resistance change as a function of current according to aspects of the present invention.

FIG. 12 is a plot of the first term $R_{inst}$ of virtual resistor changes as a function of current in one embodiment.

The second term $R_{flt}$ changes with the same rate as the virtual inductor, to enable converters to inject stable current during fault. If the root mean square (RMS) current goes beyond a threshold value, the virtual resistor and inductor changes based on the equations 5 through 7 shown below:

$$K_I = K_I + T_S \times K_{virt} \times (I_{RMS} - 1.25) \tag{5}$$

$$R_{flt} = 0.196 \times K_I \times Z_{base} \tag{6}$$

$$L_{virt} = 0.98 \times K_1 \times L_{base}. \tag{7}$$

Returning to FIG. 2, to better see the performance of the UniCon strategy in real world scenarios, the illustrated system, including of four converters 221, 222, 243, 244, is made in MATLAB Simulink. The UniCon system 300 illustrated in FIG. 3 is implemented as the main controller. The simulation utilizes parameters illustrated in FIG. 2.

Figure 13A:
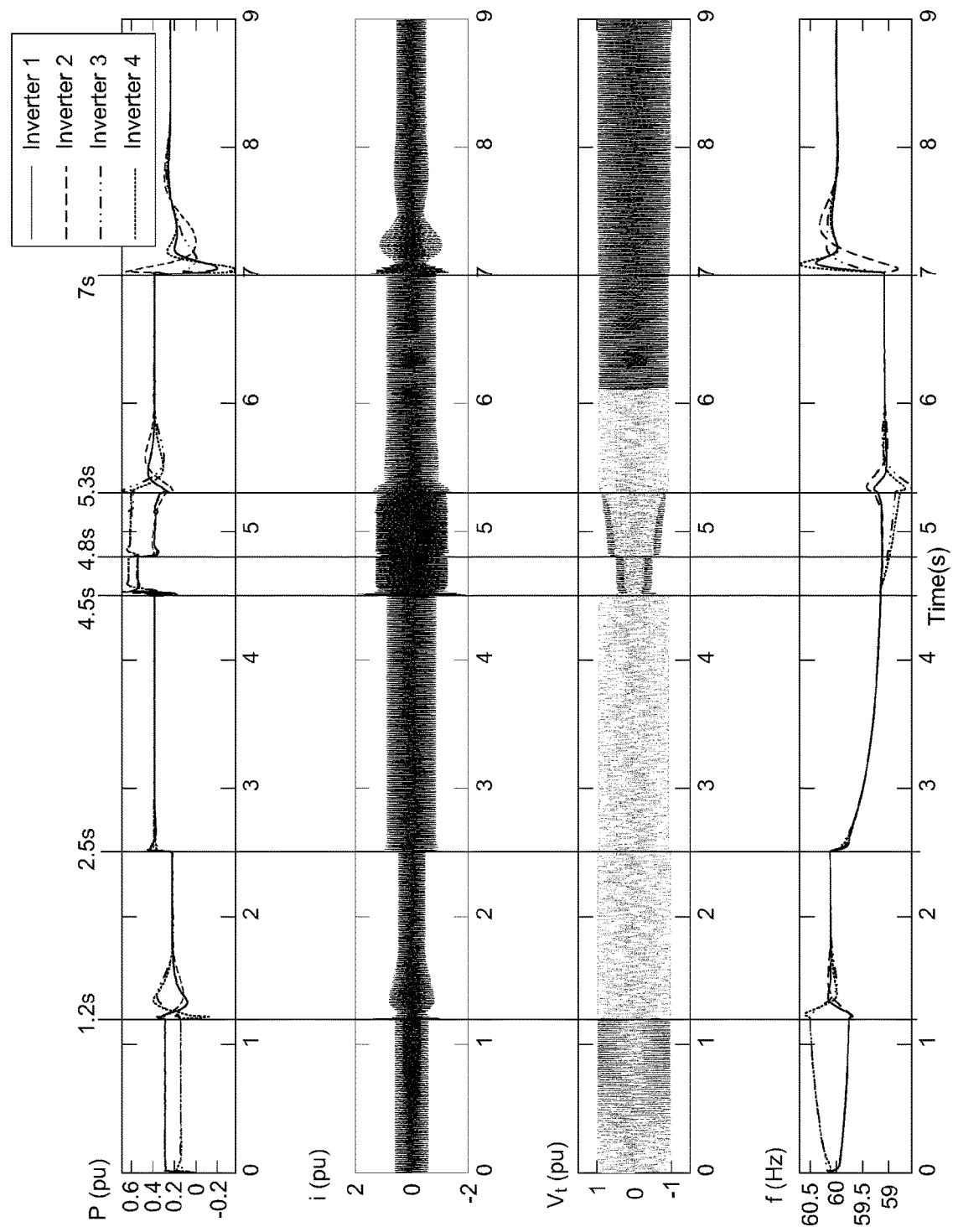
FIGS. 13A through 13B illustrate simulation results for a 4-converter system according to aspects of the present invention.
Figure 13B:
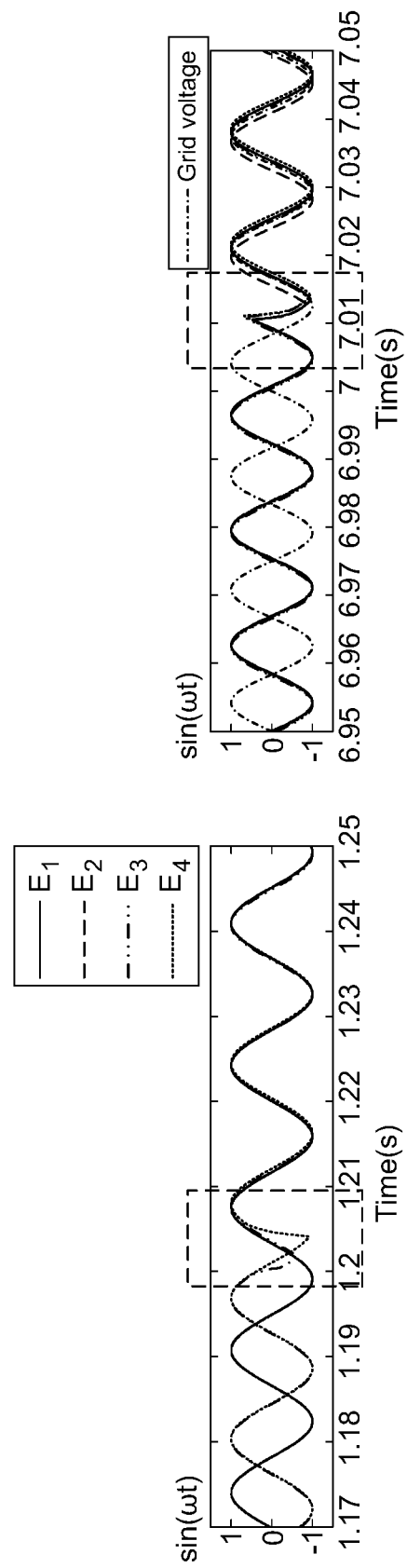

FIGS. 13A and 13B illustrate simulation results. FIG. 13A illustrates power, current, output voltage, and frequency of each of the four converters 221, 222, 243, 244. FIG. 13B illustrates internal voltage of the converters 221, 222, 243, 244.

At t=0 s, all converters start ramping up and feeding local loads. First and second converters 221, 222 form a first microgrid 220, while a second microgrid 240 includes third and fourth converters 243, 244.

At t=1.2 s, the two microgrids 220, 240 are connected together with a switch 208, and form a bigger microgrid.

Note that no converter 221, 222, 243, 244 has prior information about the impending interconnection of the microgrids 220, 240.

At t=2.5 s, a load is added step-wise to the system.

At t=4.5 s, a fault incidence happens, and the system goes into fault-ride-through condition until t=4.8 s, at which the fault is cleared.

Next, the system starts decreasing the virtual resistor to recover the voltage and synchronize converters again through adaptive inertia.

Lastly, the microgrid is connected to the grid at t=7 s.

The simulation results show that the system can manage all the transients and smoothly move between different modes of operation.

Figure 14A:
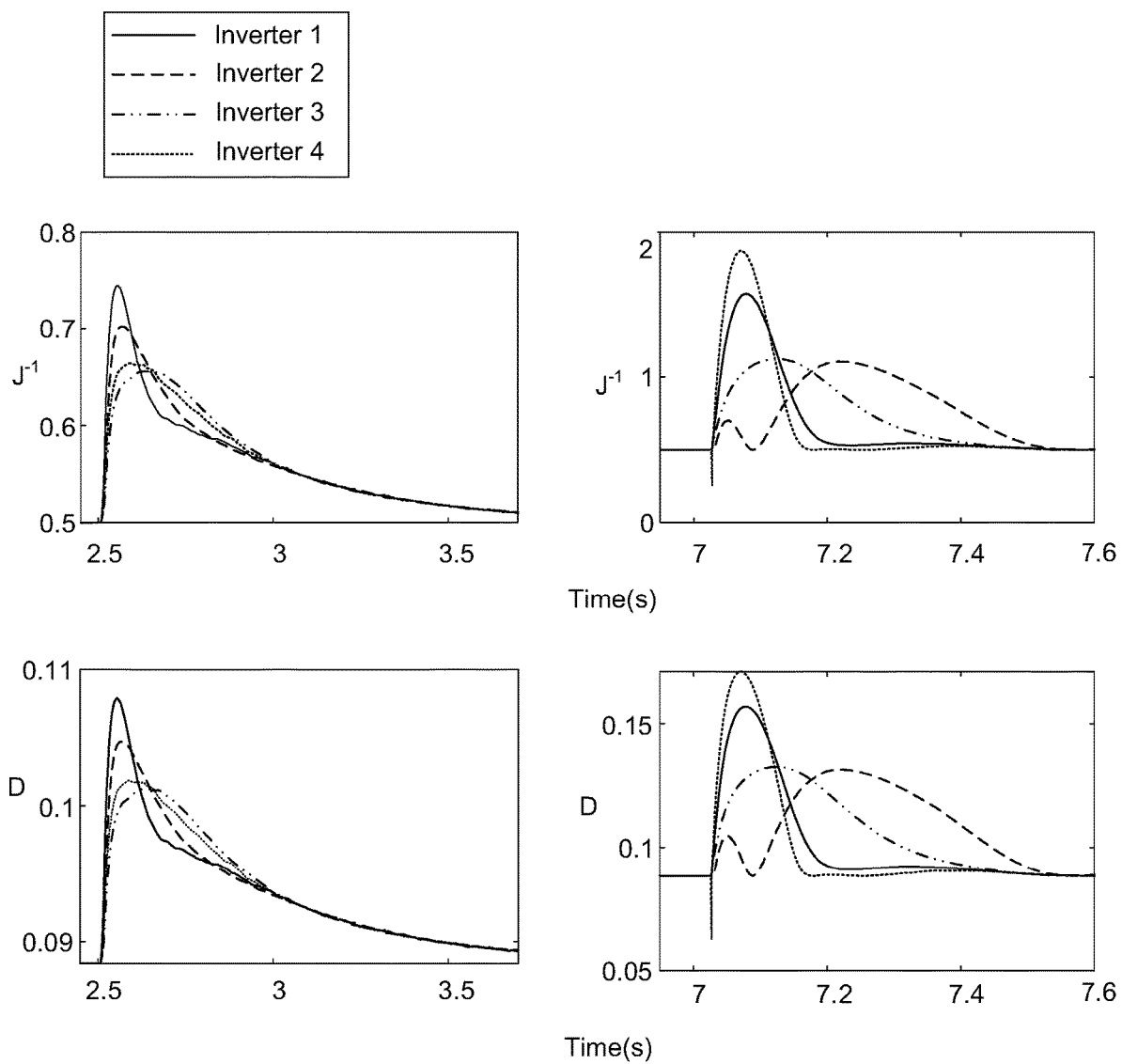
FIGS. 14A and 14B illustrate simulation results for the 4-converter system such that FIG. 14A illustrates varying inertia during load step/grid connection.

FIG. 14A shows how the inertia constant J and damping coefficient D are changed during two instances of the scenario (load change and grid-connection) to dampen the frequency response at t=2.5 s and t=7 s.

Figure 14B:
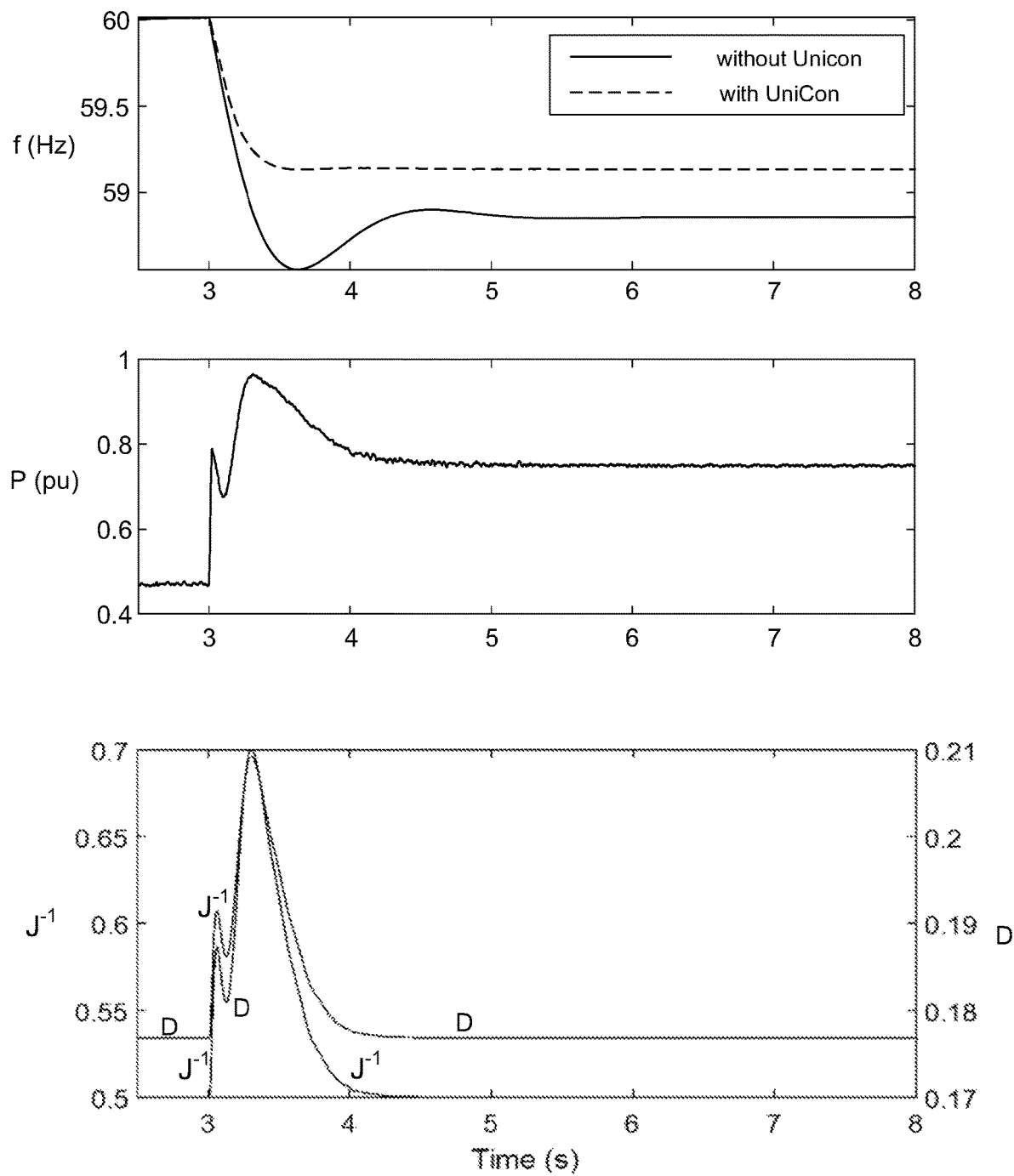

FIG. 14B illustrates grid frequency response in another scenario in which a big converter is simulated as the grid and a UniCon-controlled converter is added to support it through inertial response. It is observed that not only the second converter can improve the frequency nadir by varying its inertia constant, but it can dampen the response and remove the oscillation that occurs on the grid. In sum, the simulation results verify the effectiveness of the UniCon in variety of scenarios.

Figure 15A:
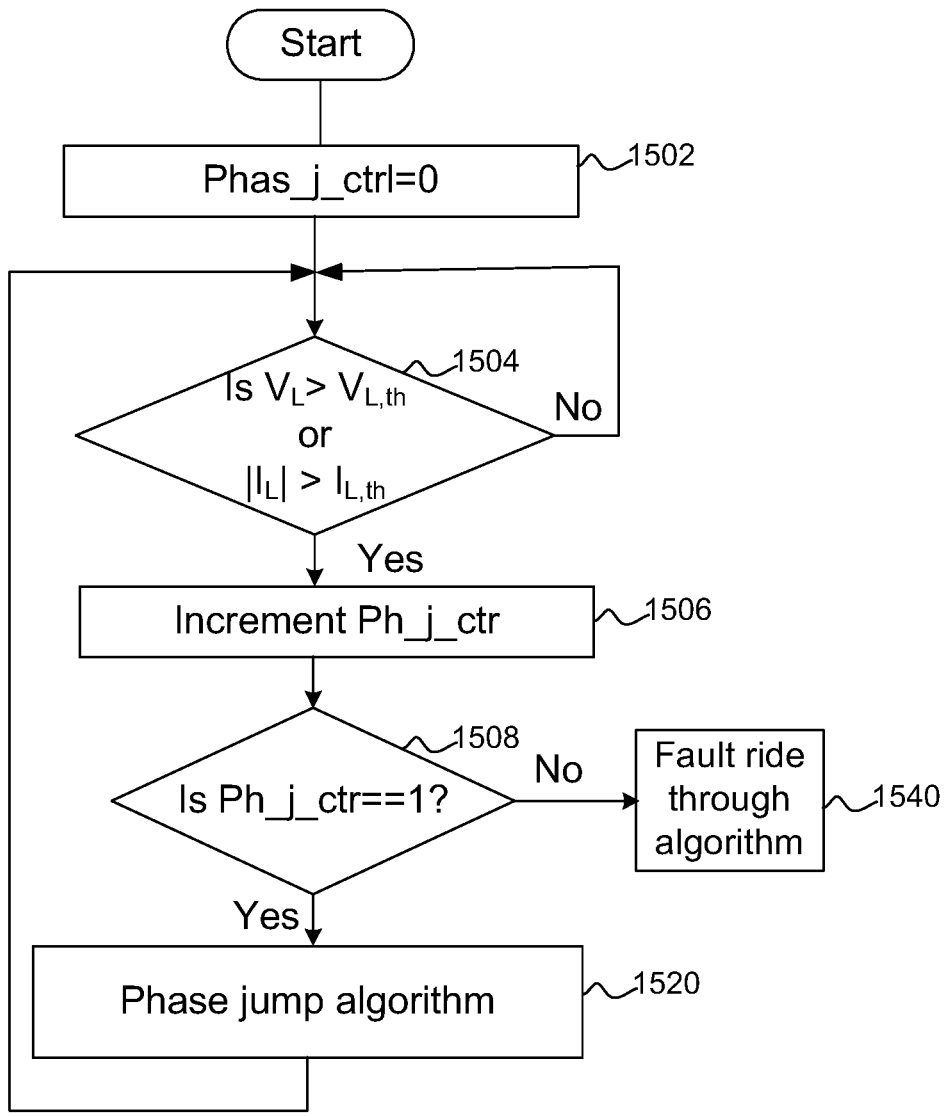
FIG. 15A is a flowchart of an algorithm activated to initiate a phase jump algorithm without requiring a quadrant jump according to aspects of the present invention.
Figure 15B:
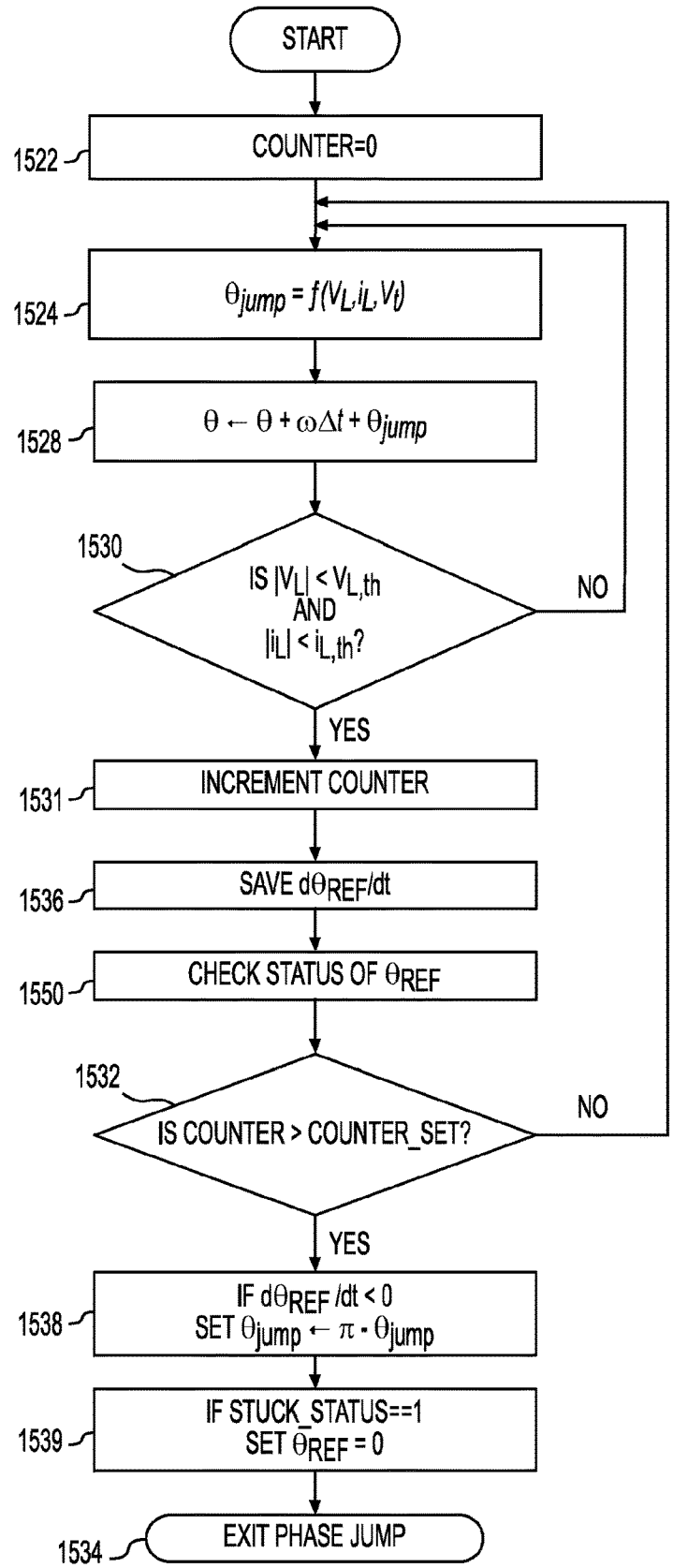
FIG. 15B is a flowchart of a phase jump algorithm called by the algorithm illustrated in FIG. 15A that does not require a quadrant jump according to aspects of the present invention.

FIG. 15A is a flowchart of an algorithm 1500 activated to initiate a phase jump algorithm 1520 illustrated in FIG. 15B which in turn utilizes a reference voltage phase status check algorithm 1550. The flowchart 1500 represents an algorithm that can be performed by either of the GFCs illustrated in FIG. 6 without communication to the other GFC. For the sake of illustration, the subscript "1" and "2" are omitted from $V_{L1}$, $V_{L2}$, $I_{L1}$, $I_{L2}$, $V_{t1}$, and $V_{t2}$ in FIGS. 15A through 15C.

Figure 15C:
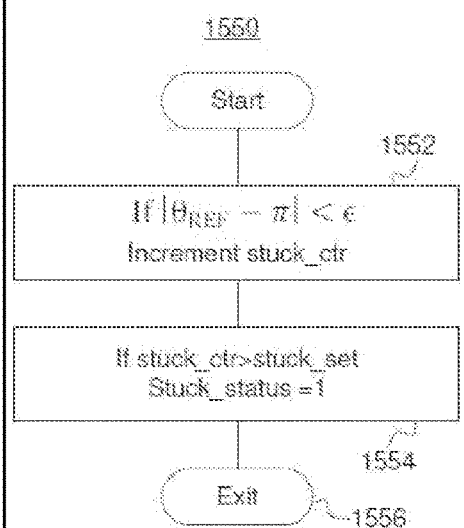
FIG. 15C is a flow chart called by the phase jump algorithm illustrated in FIG. 15B sets a variable checked by the phase jump algorithms when the reference voltage phase remains near $\pi$ after a predetermined number of iterations through a loop of the phase jump algorithm according to aspects of the present invention.

FIGS. 15A through 15C represent an algorithm to achieve phase jump that does not require a quadrant phase jump and can be used as an alternative to the algorithm 700 illustrated in FIGS. 7A and 7B.

In FIG. 15A, blocks 1502, 1504, 1506, 1508, and 1540 can be configured similarly to corresponding blocks 702, 704, 706, 708, 740 of the main algorithm 700 illustrated in FIG. 7A. The main algorithm 1500 illustrated in FIG. 15A. The main algorithm 1500 illustrated in FIG. 15A lacks blocks that correspond to voltage polarity set and check blocks 710, 716 and quadrature jump blocks 712, 718 of the main algorithm 700 illustrated in FIG. 7A. Note that the polarity set and check blocks 710, 716 are optional features of the main algorithm 700 illustrated in FIG. 7.

FIG. 15B illustrates the phase jump algorithm 1520 called by the main algorithm 1500 illustrated in FIG. 15A. In FIG. 15B, blocks 1522, 1524, 1528, 1530, 1531, 1532, and 1534 can be configured similarly to corresponding blocks 722, 724, 730, 731, 732, 734 illustrated in FIG. 7B. The phase jump algorithm 1520 illustrated in FIG. 15B lacks a block that corresponds to the phase jump block 726 of the phase jump algorithm 720 illustrated in FIG. 7B. The phase jump algorithm 1520 illustrated in FIG. 15B includes blocks 1536, 1550, 1538, 1539 which lack corresponding blocks in the phase jump algorithm 720 in FIG. 7B.

At block 1536, $d\theta_{REF}/dt$ is measured and saved. Block 1536 is entered following the increment counter block 1531.

At block 1550, a $\theta_{REF}$ status check algorithm 1550 is called. The status check algorithm 1550 is called each time through the loop of the phase jump algorithm 1520 when block 1530 is true (i.e. $V_L$ and $I_L$ are below their respective threshold values). If $\theta_{REF}$ is near $\pi$ for a number of calls to the $\theta_{REF}$ status check algorithm 1550, then the $\theta_{REF}$ status check algorithm 1550 sets a status check "Stuck_status" equal to 1.

FIG. 15C illustrates a flow diagram of the $\theta_{REF}$ status check algorithm 1550.

At block 1552, if an absolute value of $|\theta_{REF}-\pi|$ it is less than a threshold value $\epsilon$, then a counter increment "stuck_ctr" is incremented.

At block 1554, if the counter "stuck_ctr" is greater than a predetermined number "stuck_set", then the status check "Stuck_status" variable is set equal to 1.

At block 1556, the $\theta_{REF}$ status check algorithm 1550 is exited, and the phase jump algorithm 1520 illustrated in FIG. 15B proceeds to block 1532. When the condition of block 1532 is true, the loop is exited and the phase jump algorithm 1520 proceeds to block 1538.

At block 1538, if the most recent measurement of $d\theta_{REF}/dt$ obtained at block 1536 is less than zero, the $\theta_{jump}$ is set equal to $\pi-\theta_{jump}$, which will jump $\theta_{REF}$ to the next quadrant.

At block 1539, if "Stuck_status" is equal to one (set by block 1554 in FIG. 15C), then $\theta_{REF}$ is set equal to zero. Therefore, regardless of whether a quadrant jump occurred at block 1538, if $\theta_{REF}$ remains near $\pi$ after a number "stuck_set" of times of calls to the $\theta_{REF}$ status check algorithm 1550, $\theta_{REF}$ is set to zero at block 1539.

Figure 16B:
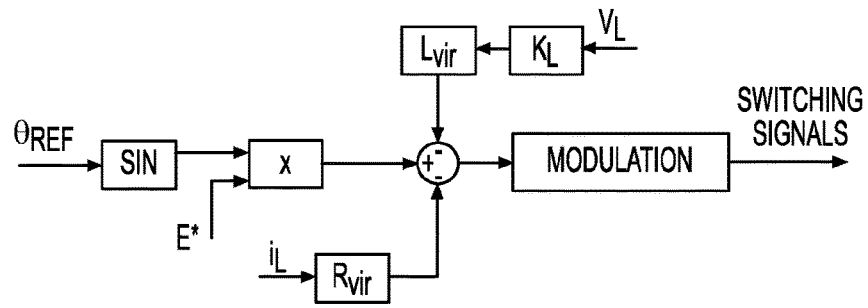
FIGS. 16B and 16C are block diagrams of two different implementations of the UniCon strategy illustrated in FIG. 16A according to aspects of the present invention.
Figure 16C:
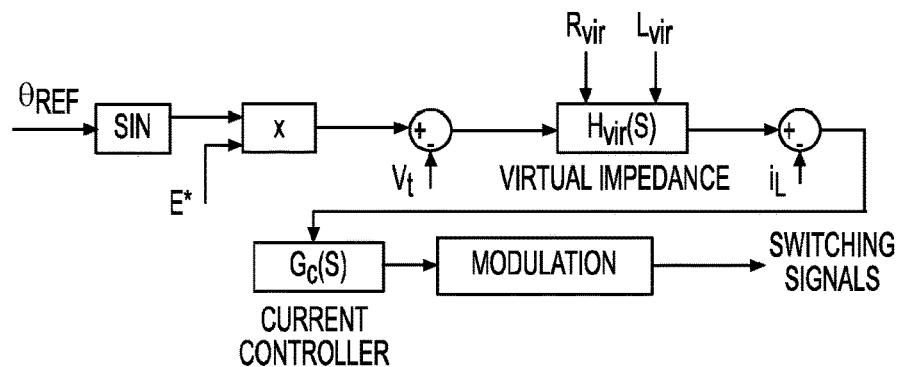

FIG. 16A is a block diagram of another embodiment of the UniCon strategy 1600. FIGS. 16B and 16C are block diagrams of two different implementations of the UniCon strategy 1600. The UniCon strategy 1600 can be implemented in a middle layer and can be added to a variety of different implementations as illustrated in FIGS. 16B and 16C. That includes control techniques that do not have a current controller, like the one shown in FIG. 16B, and control techniques that have additional control loops like a current controller, like the one shown in FIG. 16C.

Figure 17:
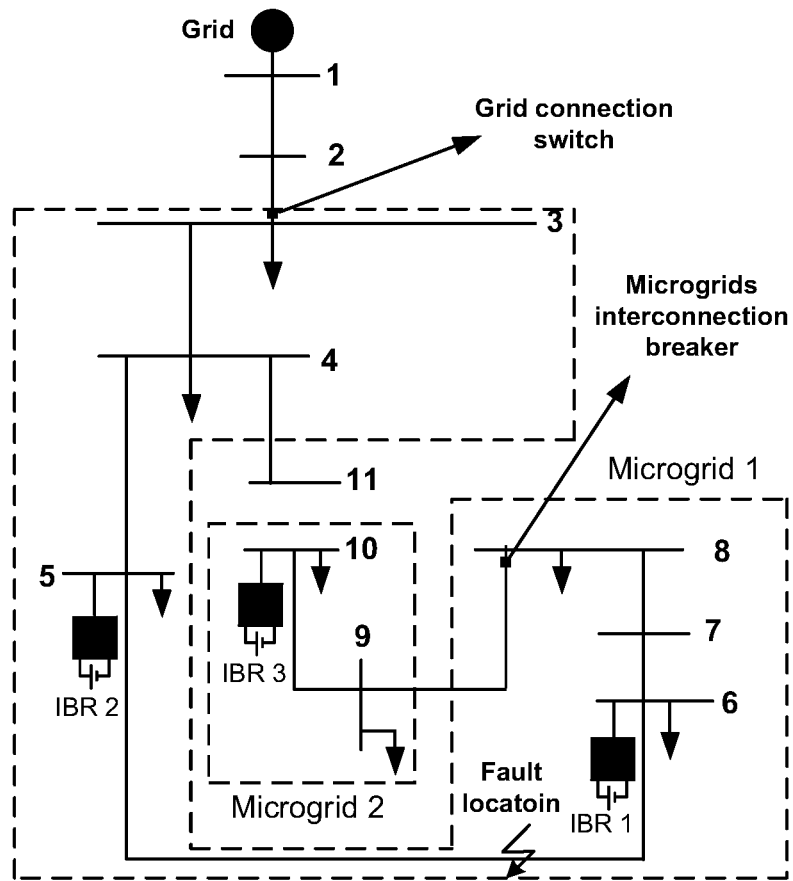
FIG. 17 is an electrical schematic of a model of an example grid tested under experimental operation as illustrated in FIGS. 18A through 18C and 19A through 19C and experimental testing as illustrated in FIGS. 20A through 20E according to aspects of the present invention.
Figure 18A:
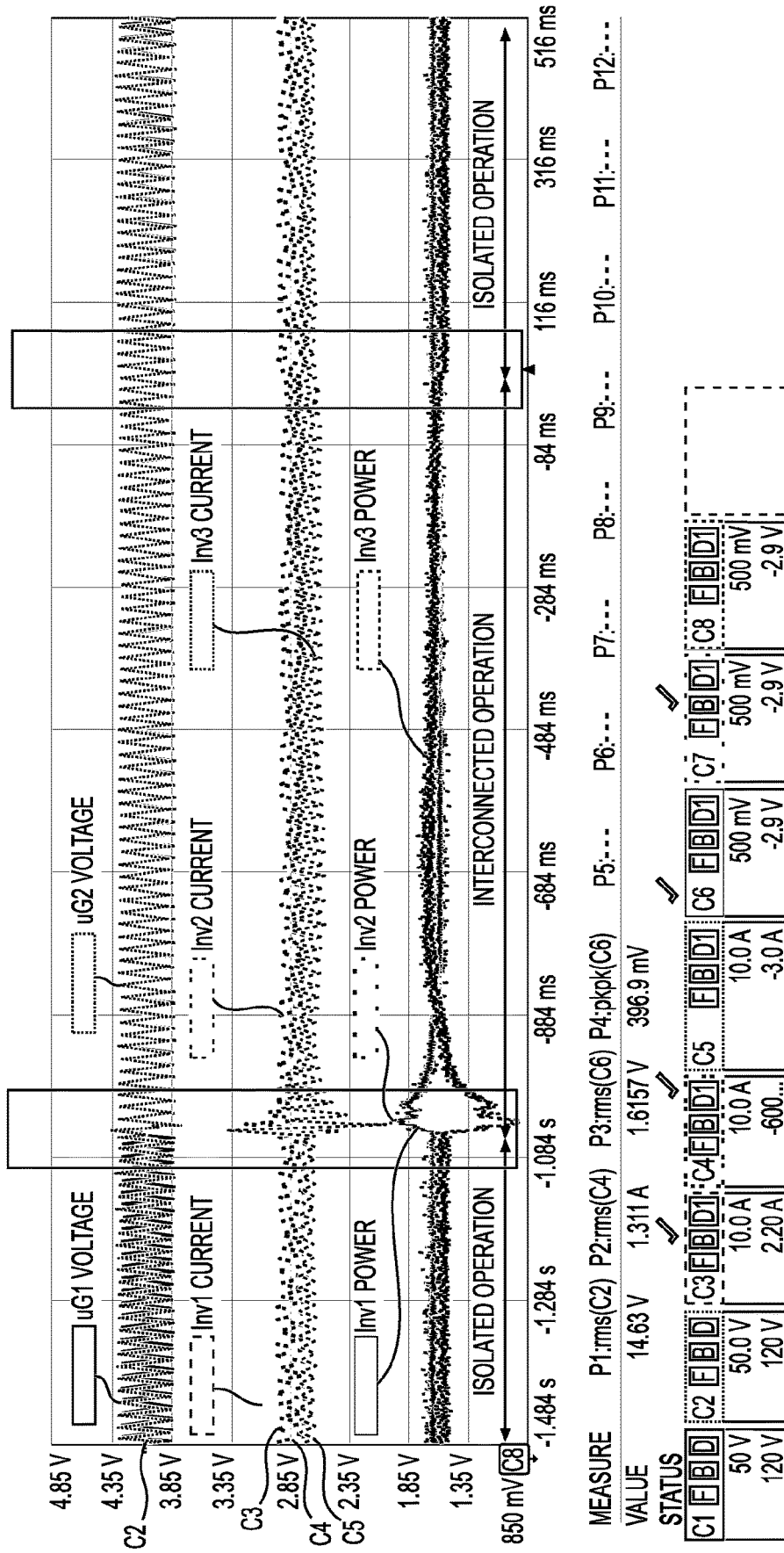
FIG. 18A includes plots of power, voltage, and current for an experimental operation of the three converter system illustrated in FIG. 17 during isolated operation, followed by interconnected operation, and followed by isolated operation according to aspects of the present invention.
Figure 18B:
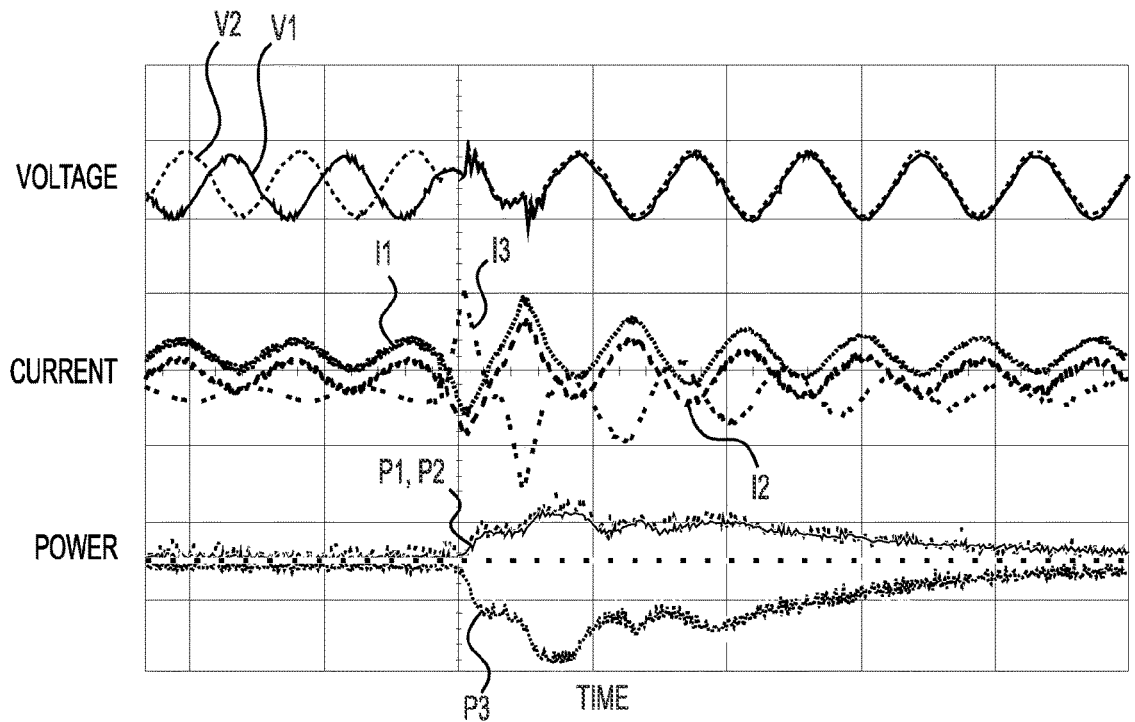
FIG. 18B is a zoomed-in view of power, voltage, and current for the three converter system during switchover from isolated operation to interconnected operation as indicated in FIG. 18A.
Figure 18C:
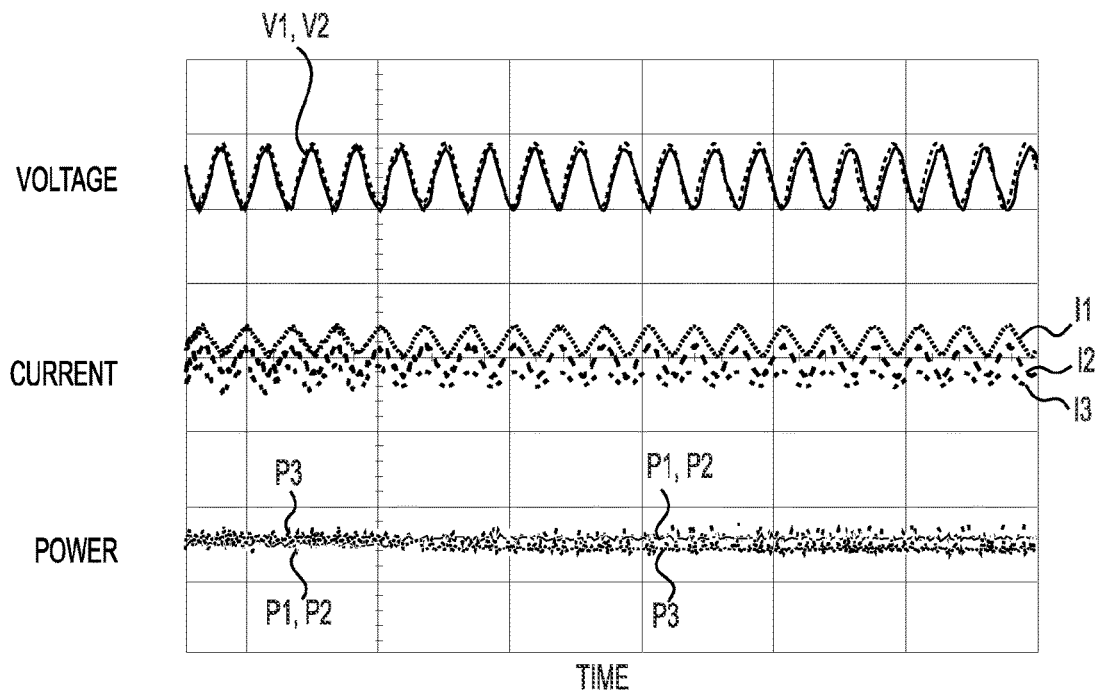
FIG. 18C is a zoomed-in view of power, voltage, and current for the three converter system during switchover from interconnected operation to isolated operation as indicated in FIG. 18A.
Figure 19A:
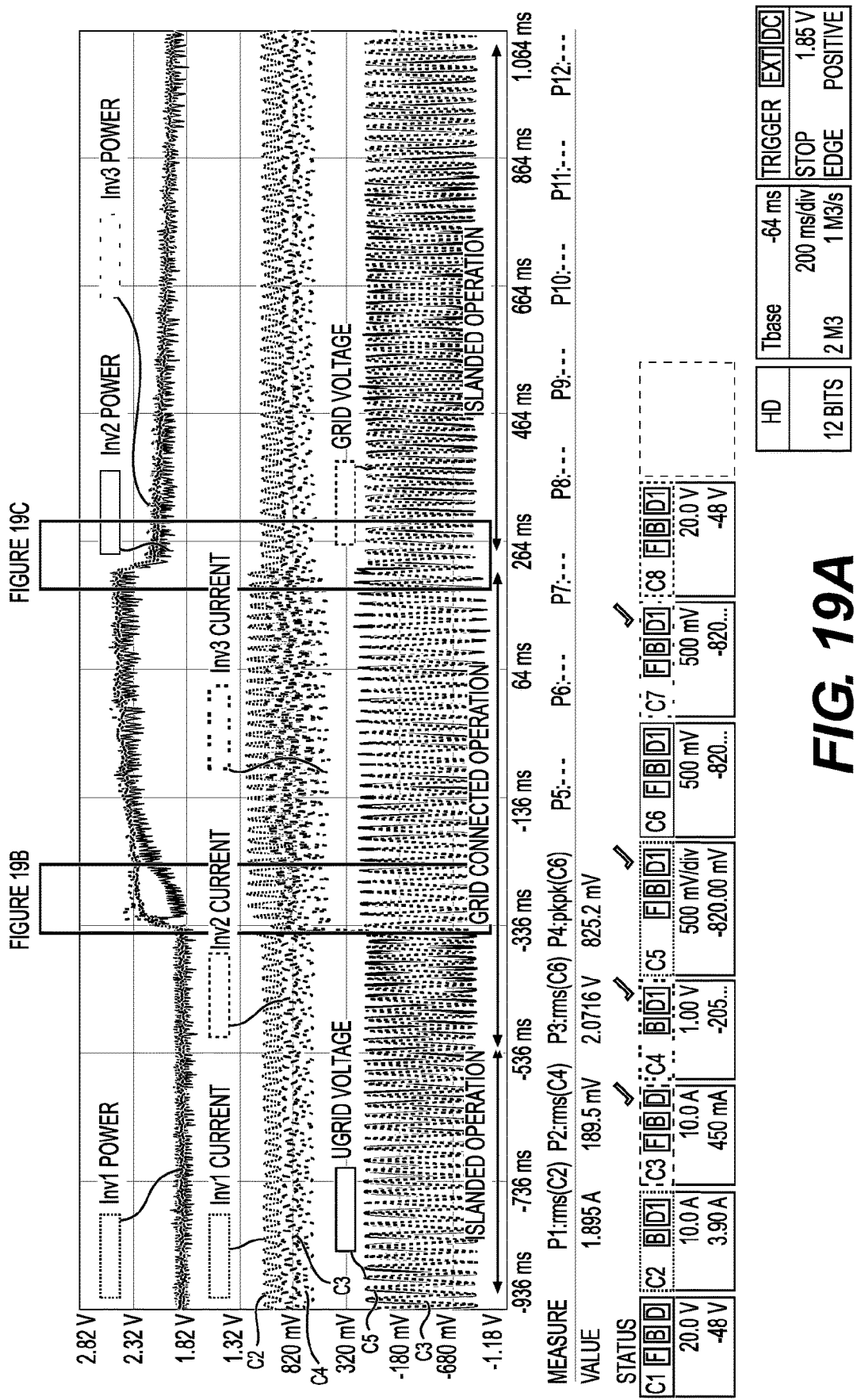
FIG. 19A includes plots of power, voltage, and current for an experimental operation of the three converter system illustrated in FIG. 17 during islanded operation, followed by grid-connected operation, and followed by islanded operation according to aspects of the present invention.
Figure 19B:
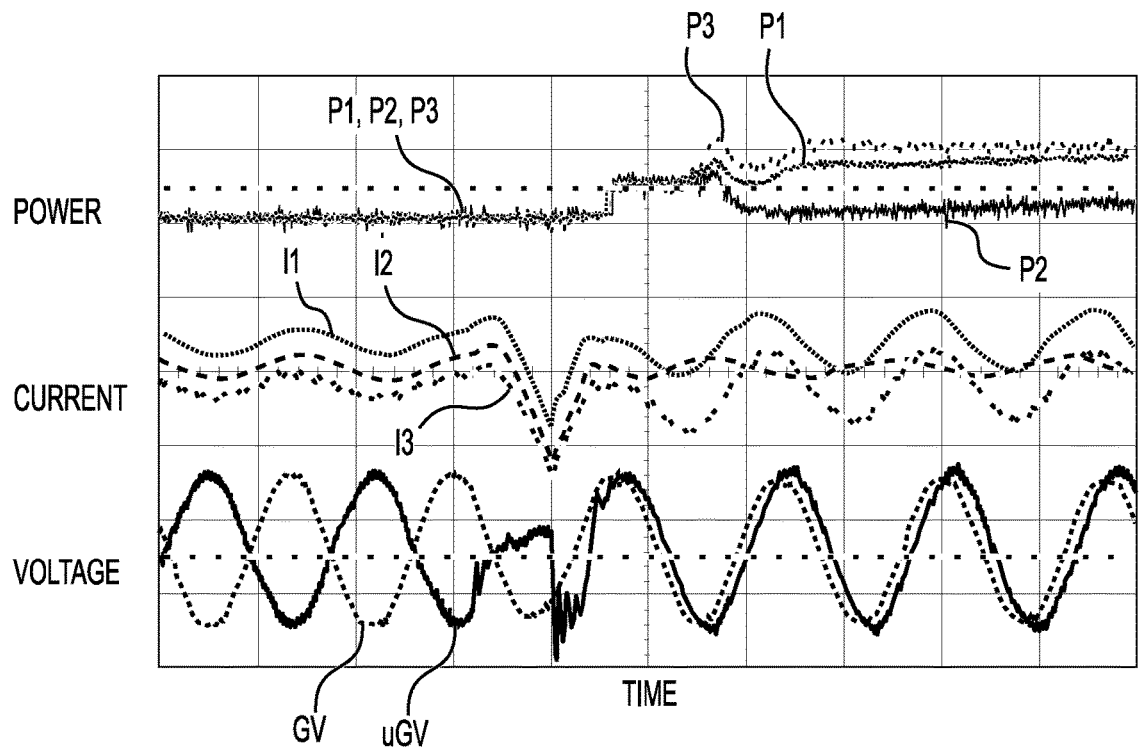
FIG. 19B is a zoomed-in view of power, voltage, and current for the three converter system during switchover from islanded operation to grid-connected operation as indicated in FIG. 19A.
Figure 19C:
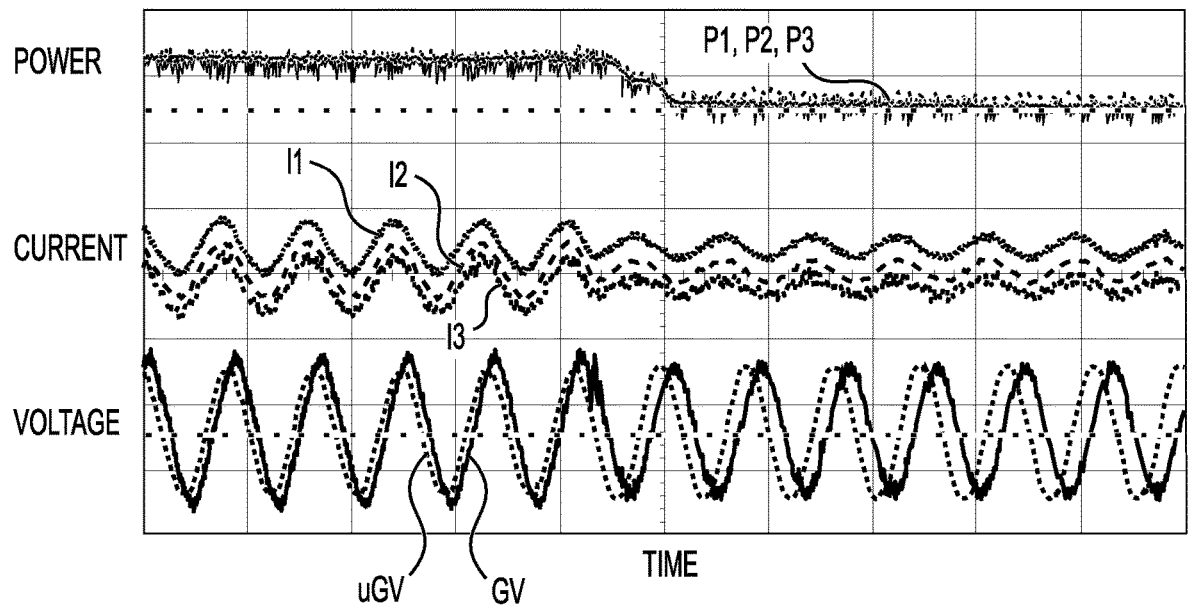
FIG. 19C is a zoomed-in view of power, voltage, and current for the three converter system during switchover from grid-connected operation to islanded operation as indicated in FIG. 19A.

FIG. 17 is an electrical schematic of a model of an example grid tested under experiment as illustrated in FIGS. 18A through 18C and 19A through 19C and experimental testing as illustrated in FIGS. 20A through 20E. The example grid includes three converters IBR1, IBR2, IBR3. The example grid includes a first microgrid (Microgrid 1) including a first and second converter IBR1, IBR2 and a second microgrid (Microgrid 2) including a third inverter IBR3. The converters IBR1, IBR2, IBR3 are not in communication with each other. FIGS. 18A through 18C illustrate seamless interconnection and disconnection of two microgrids without communication between the two microgrids. FIGS. 19A through 19C illustrate seamless grid-connection and grid-disconnection of a microgrid including three converters. FIGS. 20A through 20E illustrate smooth and stable operation of the converters during a fault.

FIG. 18A includes plots of power, voltage, and current for the three converter system during isolated operation, followed by interconnected operation, and followed by isolated operation. The grid connection switch remains open while the microgrid interconnection breaker is closed then opened in FIG. 17.

FIG. 18B is a zoomed-in view of power, voltage, and current for the three converter system during switchover from isolated operation to interconnected operation as indicated in FIG. 18A. During isolated operation, the two microgrids are isolated from each other and are connected to interconnected operation. In isolated operation, the voltage waveform V1 of the first microgrid is out of phase with the voltage waveform V2 of the second microgrid. Currents I1, I2, I3 of the three converters IBR1, IBR2, IBR3 are illustrated. Powers P1, P2, P3 of the three converters IBR1, IBR2, IBR3 are illustrated.

FIG. 18C is a zoomed-in view of power, voltage, and current for the three converter system during switchover from interconnected operation to isolated operation as indicated in FIG. 18A. During interconnected operation, the two microgrids are connected to each other and are switched to be isolated from each other during isolated operation. Currents I1, I2, I3 of the three converters IBR1, IBR2, IBR3 are illustrated. Powers P1, P2, P3 of the three converters IBR1, IBR2, IBR3 are illustrated.

FIG. 19A includes plots of power, voltage, and current for the three converter system during islanded operation, followed by grid-connected operation, and followed by islanded operation. The grid connection switch remains closes then opens while the microgrid interconnection breaker remains closed in FIG. 17.

FIG. 19B is a zoomed-in view of power, voltage, and current for the three converter system during switchover from islanded operation to grid-connected operation as indicated in FIG. 19A. During islanded operation, the two microgrids are connected to each other and the grid connection switch is open. The grid connection switch is closed to connect the two microgrids to the grid in grid-connected operation. In islanded operation, the voltage waveform uGV of the microgrids is out of phase with the voltage waveform GV of the grid. Over about one cycle, the voltage waveform of the microgrids uVG phase jumps to synchronize with the grid voltage waveform GV. Currents I1, I2, I3 of the three converters IBR1, IBR2, IBR3 are illustrated. Powers P1, P2, P3 of the three converters IBR1, IBR2, IBR3 are illustrated.

FIG. 19C is a zoomed-in view of power, voltage, and current for the three converter system during switchover from grid-connected operation to islanded operation as indicated in FIG. 19A. During grid-connected operation, the two microgrids are connected to the grid, then the grid connected switch is opened to isolate the microgrids from the grid in island operation. Currents I1, I2, I3 of the three converters IBR1, IBR2, IBR3 are illustrated. Powers P1, P2, P3 of the three converters IBR1, IBR2, IBR3 are illustrated. The voltage waveforms uGV, GV of the grid and microgrid are illustrated.

Figure 20A:
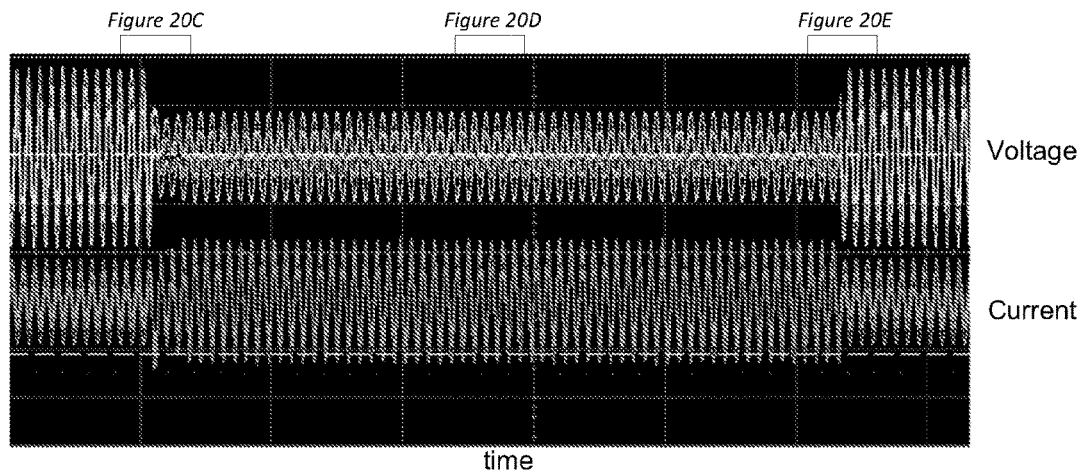
FIG. 20A is a plot of experimental data including voltage and current for the three converters IBR1, IBR2, IBR3 illustrated in FIG. 17 during a fault condition according to aspects of the present invention.

FIG. 20A is a plot of experimental data including voltage and current for the three converters IBR1, IBR2, IBR3 isolated from a grid during a fault condition in which a fault occurs between the first and second converters IBR1, IBR2 while the third converter IBR3 is connected to first converter IBR1 via connection between the first and second microgrids. The fault is initiated, the system rides through the fault, then the fault is cleared. The adaptive virtual impedance along with adaptive inertia scheme enables smooth and stable operation of inverters during fault.

Figure 20B:
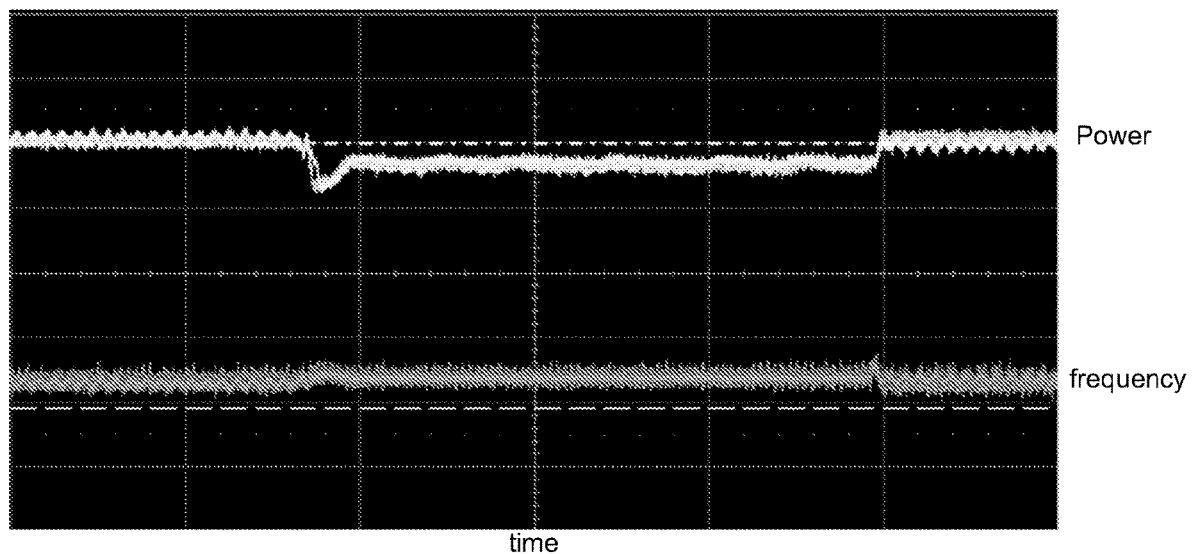
FIG. 20B is a plot of power and frequency for each of the converters IBR1, IBR2, IBR3 corresponding to the scenario tested in FIG. 20A.

FIG. 20B is a plot of power and frequency for each of the converters IBR1, IBR2, IBR3 corresponding to the scenario tested in FIG. 20A.

Figure 20C:
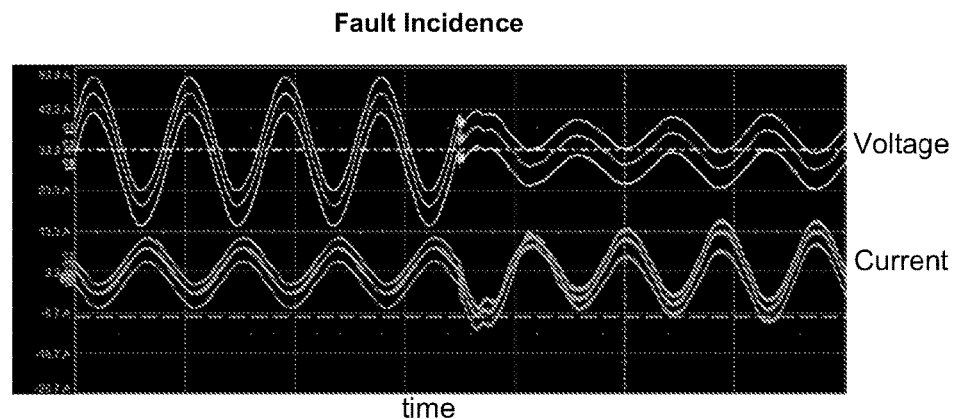
FIG. 20C is a plot of voltage and current for each of the three converters IBR1, IBR2, IBR3 at the time the fault is initiated as indicated in FIG. 20A.

FIG. 20C is a plot of voltage and current for each of the three converters IBR1, IBR2, IBR3 at the time the fault is initiated as indicated in FIG. 20A.

Figure 20D:
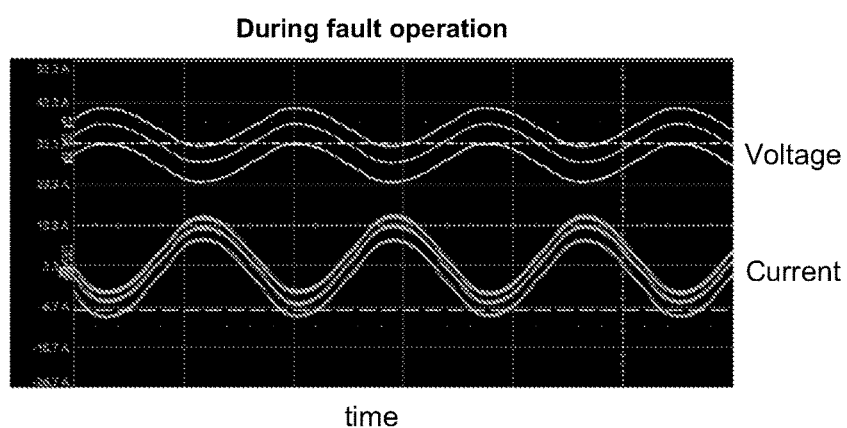
FIG. 20D is a plot of voltage and current for each of the three converters IBR1, IBR2, IBR3 during fault ride through as indicated in FIG. 20A.

FIG. 20D is a plot of voltage and current for each of the three converters IBR1, IBR2, IBR3 during fault ride through as indicated in FIG. 20A.

Figure 20E:
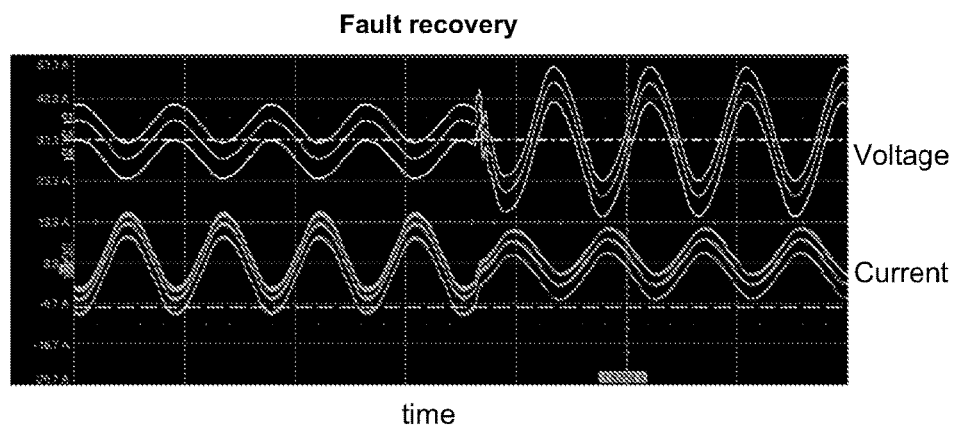
FIG. 20E is a plot of voltage and current for each of the three converters IBR1, IBR2, IBR3 at the time the fault is cleared as indicated in FIG. 20A.

FIG. 20E is a plot of voltage and current for each of the three converters IBR1, IBR2, IBR3 at the time the fault is cleared as indicated in FIG. 20A.

An adaptive inertia scheme for GFCs is disclosed herein that may enable the converters to seamlessly connect to the grid or another converter and handle load disturbances with minimal voltage/current transients and damped frequency response. The adaptive inertia here corresponds to the ability of the GFC to adapt its behavior from a zero-inertia system to a high inertia system as needed and based only on local information. To achieve this adaptive inertia behavior, the UniCon strategy includes two strategies: the first includes a rapid phase jump strategy (FIGS. 7A and 7B) to achieve voltage phase synchronization with the grid/converter, immediately after an interconnection, thereby limiting voltage/current transients; and the second one is a non-linear controller (FIG. 9) based on non-linear (integrator) inertia and non-linear damping scheme that achieves a damped frequency response on interconnection to a grid/converter or after load changes.

The ability to control the grid forming converter as per the control scheme is also disclosed herein, including p–ω droop control, non-linear integrator (inertia) and non-linear damping, rapid phase change block, and virtual impedance block.

The viability of the proposed schemes was verified through simulation and experimental results.

In some embodiments, the UniCon strategy can be implemented in hardware (e.g. a chipset) that, preferably, can be integrated into a wide variety of converter configurations. In some embodiments, the UniCon strategy can be implemented in software or firmware that, preferably, can be adapted by a wide variety of converter configurations. Some embodiments include a converter implementing the UniCon strategy.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims. Embodiments disclosed herein are not limited to the specifics of any UniCon strategy disclosed herein. Specifically, an embodiment can include an individual module, a component thereof, or a method associated therewith. Compatible features of embodiments disclosed can be combined as understood by a person skilled in the pertinent art. Features of embodiments disclosed herein can be combined with features not disclosed herein as understood by a person skilled in the pertinent art.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the disclosed technology is defined by the claims appended hereto.

What is claimed is:

1. A converter controller configured to control a converter in one or more of grid-following, grid-firming, or grid-forming modes based only on local measurements, without relying on information on a grid, the converter controller comprising:
a phase jump module configured to set a reference voltage phase of the converter in synchronization with a terminal voltage waveform of the converter with zero inertia;
an adaptive inertia module configured to set an inertia constant of the converter based at least in part on a power difference between a terminal power of the converter and a reference power of the converter; and
a virtual impedance module which dynamically varies an effective output impedance of the converter.

2. The converter controller of claim 1, wherein the converter controller is further configured to control the converter in the grid-forming mode without relying on a measurement of a frequency of a converter terminal voltage.

3. The converter controller of claim 1, wherein the converter controller is further configured to perform one or more of the following:
control the converter in an islanded mode after getting disconnected from a network comprising another converter in the grid-forming mode, a microgrid, or the grid; or
synchronize the converter with one or more of a different converter in the grid-forming mode, the microgrid, or the grid.

4. The converter controller of claim 1, wherein the converter controller is further configured to synchronize the converter with one or more of a different converter in the grid-forming mode, a microgrid, or the grid having a different frequency and phase without exceeding a rating of the converter in the grid-forming mode.

5. The converter controller of claim 1, wherein the converter controller is further configured to control the converter under high rate of change of frequency conditions.

6. The converter controller of claim 1, wherein the converter controller is further configured to control the converter under generation/load changes.

7. The converter controller of claim 1, wherein the converter controller is further configured to dynamically manage real power and reactive power during a transient.

8. The converter controller of claim 1, wherein the converter controller is further configured to synchronize the reference voltage phase of a reference voltage waveform of the converter to a terminal voltage phase of the terminal voltage waveform of the converter in response to a phase jump of the terminal voltage phase.

9. The converter controller of claim 1, wherein the converter controller is further configured to black-start a microgrid comprising the converter.

10. The converter controller of claim 1, wherein the converter controller is further configured to manage active and reactive power sharing under widely varying short circuit ratios and/or X/R (reactance/resistance) ratios.

11. The converter controller of claim 1, wherein one or more of the following:
the converter controller is further configured to control a grid forming converter to synchronize the grid forming converter with a microgrid and/or grid;
the phase jump module is further configured to set the reference voltage phase to the phase of the terminal voltage waveform through a zero inertia response;
the phase jump module is engaged in response to one of the following:
a difference in voltage between the terminal voltage waveform and the reference voltage waveform being above a voltage threshold; or
current through a filter inductor of the converter being above a current threshold;
the phase jump module is further configured to synchronize the reference voltage waveform to the terminal voltage waveform without modifying a voltage magnitude of the reference voltage waveform;
the phase jump module is further configured to nonlinearly adjust the reference voltage phase; or
the phase jump module is further configured to jump the reference voltage phase to an opposite quadrant, to avoid the reference voltage waveform and the terminal voltage waveform moving in synchronization but in opposite directions.

12. The converter controller of claim 1, wherein the phase jump module is further configured to:
determine a phase angle jump based at least in part on a difference in voltage between the reference voltage waveform and the terminal voltage waveform and/or current through a filter inductor of the converter and/or terminal voltage of the terminal voltage waveform; and
set the reference voltage phase such that the phase angle jump and angular frequency of the reference voltage waveform times sampling time are added to the reference voltage phase.

13. The converter controller of claim 12, wherein:
the phase angle jump is proportionate to a function ($f$) of the difference in voltage ($f(E-V_t)$) between the reference voltage waveform and the terminal voltage waveform; and
the function ($f$) is proportionate to a constant, a linear function, or a non-linear function.

14. The converter controller of claim 13, wherein the function ($f$) comprises hyperbolic tangent (tanh ($E-V_t$)).

15. The converter controller of claim 12, wherein:
a frequency loop comprising the adaptive inertia module is configured to provide an output phase angle ($\theta_{jump}(t)$); and
the phase angle jump is equal to $$-\theta(t) + \sin^{-1}\left[sat\left(\frac{-k_1 i(t) + k_2 V_t}{k_3 E}\right)\right];$$

wherein:
$\theta(t)$ is the angle generated by the frequency loop;
sat is the saturation function (saturation (x));

$$\text{saturation}(x) = \begin{cases} x_{max}, & x > x_{max} \\ x, & x_{min} \leq x \leq x_{max} \\ x_{min}, & x < x_{min} \end{cases}$$

$$x_{max} = 1;$$

$$x_{min} = -1;$$

$k_1$, $k_2$, $k_3$ are adjustable gains;
$i(t)$ is the filter inductor current;
$V_t$ is the terminal voltage waveform; and
$E$ is the reference voltage waveform.

16. The converter controller of claim 12, wherein one or more of the following:
- the phase jump module is configured to repeat the determining the phase angle jump through setting the reference voltage phase until the phase jump module is disengaged;
- the derivative of terminal voltage angle is measured, which then is used to determine if jump to the opposite quadrature is needed or not; or
- terminal voltage angle is constantly observed, and if the terminal voltage angle is close to $\pi$ for a predetermined set time, the terminal voltage angle is set to zero.

17. The converter controller of claim 12, wherein the phase jump module is disengaged in response to one of the following:
- a difference in voltage being below a voltage threshold and/or a current through inductive impedance being below a current threshold;
- a predetermined number of adjustments to the reference voltage phase are made;
- a predetermined time is elapsed since engagement of the phase jump module; or
- the determining the phase angle jump through setting the reference voltage phase being performed a predetermined number of times.

18. The converter controller of claim 1 further comprising a droop control module configured to set the reference power of the converter;
wherein one or more of the following:
- the droop control module is further configured to set the reference power of the converter based at least in part on an inverse relationship between active power and frequency of the converter;
- the droop control module is in a feedback loop with the adaptive inertia module;
- a difference of an output of the droop control module and terminal power is provided as an input to the adaptive inertia module; or
- a sum of an output of the adaptive inertia module and a reference angular frequency of the reference voltage waveform is provided as an input to the droop control module.

19. The converter controller of claim 1, wherein the adaptive inertia module is further configured to synchronize an internal frequency and phase of the reference voltage waveform to a terminal frequency and phase of the terminal voltage waveform without requiring a measurement of frequency of the terminal voltage waveform.

20. The converter controller of claim 1, wherein the adaptive inertia module is further configured to set the inertia constant based solely on:
- a measured power of the converter;
- a difference between the reference power and the measured power; or
- a terminal voltage magnitude of the terminal voltage waveform.

21. The converter controller of claim 1, wherein the virtual impedance module comprises an adaptive virtual impedance configured to increase impedance in response to increased current; and
wherein the virtual impedance module comprises a virtual resistor configured to vary the resistance using a non-linear function to limit the instantaneous current through a filter inductor of the converter at or below a predetermined threshold.

22. The converter controller of claim 21, wherein one or more of the following:
- the virtual impedance module further comprises a virtual inductor;
- inductance of the virtual inductor and resistance of the virtual resistor are each configured to increase in response to an increased current above a predetermined threshold using an integrator; or
- inductance of the virtual inductor and resistance of the virtual resistor are each configured to decrease in response to current being below a pre-determined threshold using an integrator.

23. The converter controller of claim 1, wherein:
- a frequency loop comprising the adaptive inertia module is configured to provide an output frequency;
- the output frequency is kept constant in a freeze mode by setting an input into the adaptive inertia module to zero when the terminal voltage is below a predetermined value for a predetermined amount of time; and
- the output frequency comes out of the freeze mode when the terminal voltage is above a predetermined value for a predetermined amount of time.

\* \* \* \* \*